(12) United States Patent
Smith et al.

(10) Patent No.: US 8,783,879 B2
(45) Date of Patent: Jul. 22, 2014

(54) RETROREFLECTIVE SHEETING

(75) Inventors: Kenneth L. Smith, White Bear Lake, MN (US); James R. Imbertson, Maplewood, MN (US); John C. Kelliher, Oakdale, MN (US); John A. Worrell, Hudson, WI (US); Sidney A. Ellingstad, Eau Claire, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 511 days.

(21) Appl. No.: 13/125,610

(22) PCT Filed: Oct. 22, 2009

(86) PCT No.: PCT/US2009/061699
§ 371 (c)(1),
(2), (4) Date: Jul. 7, 2011

(87) PCT Pub. No.: WO2010/048416
PCT Pub. Date: Apr. 29, 2010

(65) Prior Publication Data
US 2011/0255165 A1     Oct. 20, 2011

Related U.S. Application Data

(60) Provisional application No. 61/107,586, filed on Oct. 22, 2008.

(51) Int. Cl.
*G02B 5/124* (2006.01)
*B29D 11/00* (2006.01)
*C25D 7/00* (2006.01)

(52) U.S. Cl.
CPC .......... *B29D 11/00605* (2013.01); *G02B 5/124* (2013.01); *C25D 7/00* (2013.01)
USPC ........................................... 359/530; 359/529

(58) Field of Classification Search
CPC ... G02B 5/124; G02B 5/122; B29D 11/00605
USPC .......... 359/529–533; 428/141, 156, 172–174
See application file for complete search history.

(56) References Cited

U.S. PATENT DOCUMENTS

| | | | |
|---|---|---|---|
| 1,671,086 | A | 5/1928 | Stimson |
| 1,743,834 | A | 1/1930 | Stimson |

(Continued)

FOREIGN PATENT DOCUMENTS

| | | |
|---|---|---|
| GB | 243797 | 12/1925 |
| GB | 270790 | 5/1927 |
| WO | WO 96/30786 | 10/1996 |
| WO | WO 2007/124217 | 11/2007 |

OTHER PUBLICATIONS

Smith, K. *Driver-Focused Design of Retroreflective Sheeting for Traffic Signs*, in Transportation Research Board 87th Annual Meeting: Compendium of Papers DVD, Washington DC 2008.

*Primary Examiner* — James Phan
(74) *Attorney, Agent, or Firm* — Veruska C. Dias

(57) ABSTRACT

The present application relates generally to retroreflective sheeting and the tools and methods used to make retroreflective sheeting. Microreplication tools and sheeting include controlled surface structure or haze. The surface structure or haze can be introduced, for example, by chemical etching of the tool surface and/or electroplating.

9 Claims, 15 Drawing Sheets

(56) References Cited

U.S. PATENT DOCUMENTS

| | | |
|---|---|---|
| 1,809,761 A | 6/1931 | Stimson |
| 4,025,159 A | 5/1977 | McGrath |
| 4,478,769 A | 10/1984 | Pricone et al. |
| 4,588,258 A | 5/1986 | Hoopman |
| 4,726,134 A | 2/1988 | Woltman |
| 4,775,219 A | 10/1988 | Appeldorn et al. |
| 5,117,304 A | 5/1992 | Huang et al. |
| 5,138,488 A | 8/1992 | Szczech |
| 5,156,863 A | 10/1992 | Pricone et al. |
| 5,450,235 A | 9/1995 | Smith et al. |
| 5,691,846 A | 11/1997 | Benson, Jr. et al. |
| 5,822,121 A | 10/1998 | Smith et al. |
| 5,940,212 A | 8/1999 | Johnson et al. |
| 6,200,399 B1 | 3/2001 | Thielman |
| 6,258,443 B1 | 7/2001 | Nilsen et al. |
| 6,350,035 B1 | 2/2002 | Smith et al. |
| 6,386,855 B1 | 5/2002 | Luttrell et al. |
| 6,770,225 B2 | 8/2004 | Nilsen et al. |
| 6,843,571 B2 | 1/2005 | Sewall et al. |
| 6,949,779 B2 | 9/2005 | Kai et al. |
| 7,048,989 B2 | 5/2006 | Watkins et al. |
| 7,188,960 B2 | 3/2007 | Smith |
| 7,261,424 B2 | 8/2007 | Smith |
| 7,410,604 B2 | 8/2008 | Erickson et al. |
| 7,611,251 B2 | 11/2009 | Thakkar et al. |
| 2001/0048169 A1* | 12/2001 | Nilsen et al. .......... 264/2.5 |
| 2007/0242356 A1 | 10/2007 | Thakkar et al. |
| 2008/0212181 A1 | 9/2008 | Wu |

\* cited by examiner

RETROREFLECTIVE SHEETING

CROSS REFERENCE TO RELATED APPLICATIONS

This application is a national stage filing under 35 U.S.C. 371 of PCT/US2009/061699, filed Oct. 22, 2009, which claims priority to U.S. Application No. 61/107586, filed Oct. 22, 2008.

TECHNICAL FIELD

The present application relates to retroreflective sheeting and the tools and methods used to make retroreflective sheeting.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits the same total light return regardless of orientation, i.e., when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae. Commercially available methods of producing microreplicated prismatic sheeting include, for example, U.S. Pat. No. 7,410,604 (Erickson), PCT Patent Publication No. 2007124217 (Thakkar), U.S. Pat. No. 6,200,399 (Thielman), and U.S. Pat. No. 5,691,846 (Benson). These microreplication processes produce a retroreflective sheeting with prismatic structures that have been precisely and faithfully replicated from a microstructured tool having a negative image of the desired prismatic structure.

Prismatic retroreflective sheeting is known for returning a large portion of the incident light towards the source (Smith, K. *Driver-Focused Design of Retroreflective Sheeting For Traffic Signs*, in Transportation Research Board 87th Annual Meeting: Compendium of Papers DVD, Washington D.C. 2008). Many commercially available products rely on the relatively high retroreflectance (light return toward the source) provided by prismatic cube corner microstructures to meet high retroreflectance specifications (e.g., retroreflectance ($R_A$) or brightness in the range of 300 to 1000 candela per lux per meter square (cpl) for 0.2 degree observation angle and −4 entrance angle), such as ASTM types III, VII, VIII, IX, and X, as described in ASTM D 4956-04, and type XI.

However, prismatic cube corner microstructures have not been used in products designed to meet lower retroreflectance specifications (e.g., $R_A$ in the range of 70 to 250 cpl for 0.2 degree observation angle and −4 entrance angle for white sheeting), such as ASTM types I and II as described in ASTM D 4956-04. Instead, commercially available ASTM type I and II products utilize glass beads embedded in multiple layers of polymeric materials as the optical elements. A specular reflective coating, typically vacuum deposited aluminum, is situated behind the glass beads near the light focal point to enable retroreflection.

SUMMARY

The manufacturing processes involved in making beaded sheeting that meets the lower retroreflectance specifications, such as ASTM types I and II, typically involve solvent casting, and the overall processes involve multiple, time-consuming solvent and vacuum coating operations. These multiple operations cause increased rolled throughput yield loss and higher solid wastes. Additionally, the solvents that are removed from the polymeric coatings are sometimes released into the atmosphere. More often, the environmental unacceptability of these solvents requires manufacturers to thermally convert them to carbon dioxide and water vapor prior to atmospheric release, which is time-consuming and expensive. While less detrimental to the environment than the original solvents, carbon dioxide is an increasingly undesirable greenhouse gas. Overall, the conventional processes for producing retroreflective sheeting utilizing glass beads are time-consuming, energy inefficient, and generate considerable amounts of environmentally undesirable solid and gaseous waste.

In contrast, the processes commonly used to commercially produce microreplicated prismatic sheeting are simpler in concept and are less environmentally harmful. Specifically, these processes exhibit decreased process cycle time and increased rolled throughput yields. Microreplication processes are also generally solvent free, substantially eliminating concerns about atmospheric emissions as well as undue energy consumption during manufacturing. These advantages make microreplication a preferred process from both an environmental and manufacturing efficiency standpoint.

Consequently, the inventors of the present application sought to use the more efficient microreplication process to form sheeting that meets the lower retroreflectance specifications, such as ASTM types I and II or equivalent worldwide specifications.

The inventors of the present application also sought to control retroreflectance ($R_T$ and $R_A$) reduction for prismatic sheeting by introducing surface structures or texturizing the tooling used in the microreplication process. The surface structure is microreplicated in the prismatic sheeting and is particularly suitable in reducing retroreflectance across a broad range of observation angles. This controlled reduction in retroreflectance allows for prismatic sheeting which conforms with, for example, ASTM type I and II specifications, while maintaining the benefits associated with the microreplication process. In some embodiments, surface structure is also introduced on the top surface of the sheeting to further modify observation angularity and retroreflectance. Controlled surface structure or haze is introduced into microreplication tooling using, for example, two different methods. The first method is chemical etching of the tool surface and the second method is short duration electroplating.

Some embodiments of the present application relate to retroreflective sheeting comprising an array of cube corner elements wherein at an entrance angle of −4 degrees the sheeting exhibits a fractional retroreflectance slope of between about 3% and about 15% at an observation angle of about 0.5 degree.

Some embodiments of the present application relate to retroreflective sheeting comprising an array of cube corner elements that exhibits an average brightness at 0° and 90° orientation according to ASTM D4596-09 of between about 70 candelas/lux/m² and about 250 candelas/lux/m² for an entrance angle of −4° and an observation angle of 0.2° wherein the sheeting has a color that is one of white or silver.

Some embodiments of the present application describe retroreflective sheeting, comprising: an array of cube corner elements having an average surface roughness between about 0.0005 microns and about 0.0060 microns.

Some embodiments of the present application relate to an article comprising at least one truncated cube corner element that is texturized to include surface texture. In some embodiments, the article comprises a tool. In some embodiments, the article is a positive or negative replica of a tool. In some embodiments, the replication is retroreflective sheeting comprising an array of cube corner elements. In some embodiments, the replication is retroreflective sheeting comprising an array of cube corner cavities.

Some embodiments of the present application relate to a method of making retroreflective sheeting having an average brightness at 0° and 90° orientation according to ASTM D4596-09 of between about 70 candelas/lux/m² and 250 candelas/lux/m² for an entrance angle of −4° and an observation angle of 0.2°, comprising texturizing the surface of a tool that is replicated to form the retroreflective sheeting. In some embodiments, the texturizing step is effected by etching. In some embodiments, the etching is effected by chemical etching. In some embodiments, the texturizing step is effected by plating. In some embodiments, the plating involves electroplating. In some embodiments, the sheeting is white or silver colored Some embodiments of the present application relate to a method of making retroreflective sheeting that decreases light return over the full range of observation angles.

The novel methods and tools described herein permit the formation of sheeting having novel optical and physical properties.

DETAILED DESCRIPTION

Figure 1A:
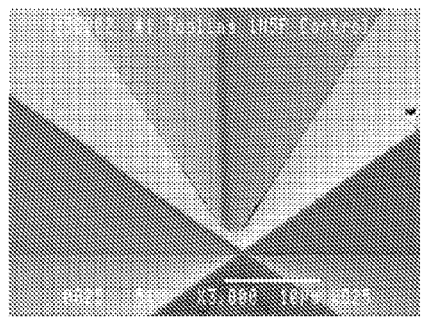
FIGS. 1a, 1b, 1c, and 1d are scanning electron micrographs (SEMs) showing a portion of tooling made according to Examples Comparative A, G, H, and I, respectively, at a magnification of 3,000×.

Formation of prismatic sheeting that meets lower retroreflectance specifications, such as ASTM types I and II, involves altering the optical and physical properties of currently commercially available sheeting as well as formulating novel processes of manufacturing the sheeting. Specifically the retroreflectivity, or brightness, of currently commercially available cube corner sheeting must be decreased. This decrease can be effected, for example, by the formation of surface structures on the microreplication tooling. Formation of these structures on the tooling results in formation of haze in the sheeting. The haze on the sheeting reduces the retroreflectance of the sheeting across a broad range of observation angles. Formation of the surface structures on the tooling can be effected by, for example, chemical etching of the tool surface or short duration electroplating, each of which are discussed in greater detail below. Truncated cubes or full cubes may be used in the methods and apparatuses of the present application, but truncated cubes are preferred.

In general, chemically etching the tool involves placing the tool (typically a nickel tool) into contact with the etching solution for a desired amount of time. The longer the amount of exposure, the greater the degree of etch on the tool. In this way, the operator can control the degree of etch on the tool and thus the amount of haze on the sheeting made using the tool. Etching the tool surface formed sheeting that had a more matte, whiter appearance during daytime lighting as compared to standard, commercially available beaded and/or prismatic sheeting.

In general, electroplating the tool (typically a nickel tool) involves plating material onto the surface of the tool and then passivating the tool for subsequent replication (e.g., by nickel electroforming). The replicated tooling will be a positive or negative replica of the plated tooling. In contrast from a traditional electroforming operation and more similar to a conventional plating process, anchorage of the plated metal is preferred. The amount of material deposited onto the tool determines the change in reflective brightness (i.e., more material deposited onto the tool results in decreased retroreflectivity). Electroplating the tool surface formed sheeting that had a more matte, whiter appearance as compared to standard, commercially available beaded and/or prismatic sheeting.

In addition to or instead of the chemical etching and/or electroplating processes described above, surface structure or roughness can be introduced into a top film placed onto retroreflective sheeting in order to reduce brightness. A variety of methods for introducing surface and intermediate structures which change the return light distribution are contemplated in the literature, as is described in, for example, PCT Application No. WO9630786 to Nilsen.

In some embodiments, the retroreflective sheeting of the present application may be manufactured as an integral material, i.e., wherein the cube-corner elements are interconnected in a continuous layer throughout the dimension of the mold, the individual elements and connections therebetween comprising the same material. The surface of the sheeting opposing the microprismatic surface, often referred to as the "land layer," can be smooth and planar (e.g., by the introduction of a smooth film or by using smooth plates on a compression molding press) or can be roughened or texturized, as is described above. The thickness of the land layer (i.e., the thickness excluding that portion resulting from the replicated microstructure) is preferably between about 0.001 and about 0.100 inches and more preferably between about 0.003 and about 0.010 inches. Manufacture of such sheeting is typically achieved by casting a fluid resin composition onto the tool and allowing the composition to harden to form a sheet, as is described in, for example, U.S. Pat. No. 7,410,604 (Erickson).

A resin composition may be used in combination with the sheeting of the present application. Suitable resin compositions include transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. These materials may also include dyes, colorants, pigments, UV stabilizers, or other additives.

A specular reflective coating, such as a metallic coating, can be placed on the cube-corner elements. The metallic coating can be applied by known techniques such as vapor depositing or chemically depositing a metal such as aluminum, silver, or nickel. A primer layer may be applied to the backside of the cube corner elements to promote the adherence of the metallic coating. In addition to or in lieu of a metallic coating, a seal film can be applied to the backside of the cube-corner elements; see, for example, U.S. Pat. Nos. 4,025,159 (McGrath) and 5,117,304 (Huang). The seal film maintains an air interface at the backside of the cubes that enables total internal reflection at the interface and inhibits the entry of contaminants such as soil and/or moisture. Further a separate overlay film may be utilized on the viewing surface of the sheeting for improved (e.g., outdoor) durability or to provide an image receptive surface. Indicative of such outdoor durability is maintaining sufficient brightness specifications such as called out in ASTM D4956-04 after extended durations of weathering (e.g., 1 year, 3 years). Further the CAP-Y whiteness is preferably greater than 20 for a white product before and after weathering and more preferably greater than 30.

An adhesive layer also can be disposed behind the cube-corner elements or the seal film to enable the cube-corner retroreflective sheeting to be secured to a substrate. Suitable substrates include wood, aluminum sheeting, galvanized steel, polymeric materials such as polymethyl methacrylates, polyesters, polyamides, polyvinyl fluorides, polycarbonates, polyvinyl chlorides, polyurethanes, and a wide variety of laminates made from these and other materials.

The sheetings of the present application can be forward or backward canted, as described in, for example, U.S. Pat. No. 4,588,258 (Hoopman) and can include distortion, as described, for example, in U.S. Pat. No. 4,775,219 (Appeldom).

Regardless of which method is used to make the retroreflective sheeting, the sheeting of the present application has certain unique optical features. One way of measuring these unique optical features is measuring total light return. Predicted total light return for a cube corner matched pair array may be calculated from percent active area and ray intensity. Total light return is defined as the product of percent active area and ray intensity.

Another way of measuring these unique optical features of the sheeting of the present application involves measuring the coefficient of retroreflection, $R_A$, which can be measured according to US Federal Test Method Standard 370 at −4° entrance, 0° orientation, and at various observation angles. The sheeting of the present application meets brightness specifications called out in ASTM D 4956-04 for Types I and II sheeting.

$R_A$ is typically measured at discrete observation angles and averaged over the annular region between two adjacent measured observation angles. Incremental % $R_T$ for a given observation angle is determined by multiplying this average $R_A$ by the area of this annular region divided by the cosine of the entrance angle. Fractional retroreflectance % $R_T$ is the sum of incremental % $R_T$ for observation angles between 0 and the observation angle of interest ($\alpha_{max}$). Fractional retroreflectance slope for a given observation angle is the incremental % $R_T$ divided by the difference between the adjacent observation angles.

The brightness of the sheeting of the present application is preferably between about 70 and about 250 candelas per lux per square meter (CPL) at an observation angle of 0.2° observation angle and −4° entrance angle. Preferably, this is for the average of 0 and 90 degree orientation.

In some embodiments, the retroreflective sheeting of the present application is white or silver colored. The silver color may be imparted by the existence of a metalized layer as the specular reflective layer of the prismatic retroreflective sheeting. The performance requirements for a silver colored sheeting are the same as for a white colored sheeting.

Another way of measuring these unique optical features of the sheeting of the present application involves measuring the fractional retroreflectance $R_T$. Fractional retroreflectance ($R_T$) is another useful parameter for characterizing retroreflection. $R_T$, which is explained in detail in ASTM E808-01, is the fraction of unidirectional flux illuminating a retroreflector that is received at observation angles less than a designated maximum value, $\alpha_{max}$. Thus, $R_T$ represents the portion of light being returned within a prescribed maximum observation angle, $\alpha_{max}$. In a manner consistent with ASTM E808-01, $R_T$ can be calculated as follows:

$$R_T = \int_{\alpha=0}^{\alpha_{max}} \int_{\gamma=-\pi}^{\pi} \left(\frac{R_a}{\cos(\beta)}\right)(\alpha) d\gamma d\alpha,$$

where $\alpha$ is the observation angle (expressed in radians), $\gamma$ is the presentation angle (also expressed in radians), $\beta$ is the entrance angle, and $R_a$ is the conventional coefficient of retroreflection expressed in units of candelas per lux per square meter. For purposes of this application, $R_T$ refers to the fractional retroreflectance expressed as a decimal, and % $R_T$ refers to the fractional retroreflectance expressed as a percentage, i.e., % $R_T = R_T \times 100\%$. In either case, the fractional retroreflectance is unitless. As a graphical aid in understanding the observation angularity of a retroreflective sheeting, fractional retroreflectance may be plotted as a function of maximum observation angle, $\alpha_{max}$. Such a plot is referred to herein as an $R_T$-$\alpha_{max}$ curve, or a % $R_T$-$\alpha_{max}$ curve.

Another useful parameter for characterizing retroreflection is $R_T$ Slope, which can be defined as the change in $R_T$ for a small change or increment in the maximum observation angle, $\Delta\alpha_{max}$. A related parameter, % $R_T$ Slope, can be defined as the change in % $R_T$ for a small change in maximum observation angle, $\Delta\alpha_{max}$. Thus, $R_T$ Slope (or % $R_T$ Slope) represents the slope or rate of change of the $R_T$-$\alpha_{max}$ curve (or % $R_T$-$\alpha_{max}$ curve). For discrete data points these quantities may be estimated by calculating the difference in $R_T$ (or % $R_T$) for two different maximum observation angles $\alpha_{max}$, and dividing that difference by the increment in maximum observation angle, $\Delta\alpha_{max}$, expressed in radians. When $\Delta\alpha_{max}$ is expressed in radians, $R_T$ Slope (or % $R_T$ Slope) is the rate of change per radian. Alternatively and as used herein, when $\Delta\alpha_{max}$ is expressed in degrees, $R_T$ Slope (or % $R_T$ Slope) is the rate of change per degree in observation angle.

The equation given above for $R_T$ involves integrating the coefficient of retroreflection $R_A$ and other factors over all presentation angles ($\gamma=-\pi$ to $+\pi$) and over a range of observation angles ($\alpha=0$ to $\alpha_{max}$). When dealing with discrete data points, this integration can be performed using $R_A$ measured at discrete observation angle $\alpha_{max}$ values (0.1 degrees) separated by increments $\Delta\alpha_{max}$.

Objects and advantages of the invention are further illustrated by the following examples, but the particular materials and amounts thereof recited in the examples, as well as other conditions and details, should not be construed to unduly limit the invention.

EXAMPLES

Comparative Example A

A master was prepared as described in U.S. Pat. No. 6,843,571 (Sewall). Three groove sets, which formed truncated microprisms having a height of approximately 92 microns (0.0036 inch), were cut onto a machinable metal using a high precision diamond tool such as "K&Y Diamond," manufactured and sold by Mooers of New York, U.S.A. The microprisms had isosceles base triangles formed as matched pairs with 56.5, 56.5 and 67 degrees included angles, such as generally described in U.S. Pat. No. 5,138,488 (Szczech). The three groove sets had a design target comprising included orthogonal angles of 64.02, 64.02, and 82.89 degrees. The design target is the sum of the orthogonal angles plus any intentional changes introduced to tailor the mold or sheeting to the divergence profile. The 82.89 groove set was the primary groove set ((see, for example, U.S. Pat. No. 5,822,121 (Smith) and U.S. Pat. No. 4,588,258 (Hoopman) for an explanation of canted cubes and primary groove sets)). The design target of the primary groove angle from the orthogonal was effected using non-orthogonal cubes having tailored divergence profiles, as described in U.S. Pat. No. 4,775,219 (Appeldorn). The change of the primary groove angle was approximately +0.08 degrees resulting in a design target of 82.97 degrees; the change of each secondary groove was approximately −0.093 degrees resulting in a design target of 63.93 degrees. Primary groove angle deviation from the design target is the difference of the measured groove angle for a particular sample from the design target. One preferred sample used in groove angle measurement includes negative toolings containing microcube prism recesses.

The master was removed from the groove-forming machine. A first generation negative tooling was made from the master by nickel electroforming the master in a nickel sulfamate bath as generally described in U.S. Pat. Nos. 4,478,769 (Pricone) and 5,156,863 (Pricone). Additional multigenerational positive and negative copies were formed such that the tooling had substantially the same degree of precise cube formation as the master. Multiple second generation negative toolings containing microcube prism recesses were subsequently turned into an endless belt 20 feet (6.1 m) in length in the downweb direction and 3 feet (0.92 m) in the crossweb direction, as generally described in U.S. Pat. No. 7,410,604 (Erickson).

A "Makrolon™ 2407" polycarbonate resin supplied by Mobay Corporation, Pennsylvania, U.S.A. was cast onto the negative tooling. Molten polycarbonate was cast at a temperature of 550° F. (287.8° C.) onto the negative tooling, which was heated to 420° F. (215.6° C.) at a pressure of approximately $1.03\times10^7$ to $1.38\times10^7$ pascals (1500 to 2000 psi) for 0.7 seconds in order to replicate the microcube recesses. Coincident with filling the cube recesses, additional polycarbonate was deposited in a continuous land layer above the tooling with a thickness of approximately 102 micrometer (0.004 inch). A previously extruded 51 micrometer (0.002 inch) thick impact modified continuous poly (methylmethacrylate) (PMMA) layer film, as described in U.S. Pat. No. 5,450,235 (Smith), was laminated onto the top surface of the continuous polycarbonate land layer when the surface temperature was approximately 190.6° C. (375° F.). A polyethyleneterephtalate (PET) smoothing film with an optically smooth surface and a thickness of about 85 micrometer (0.0034 inch) was introduced simultaneously to the lamination of the PMMA onto the polycarbonate land layer. The lamination of the above films was accomplished using a nip roll covered with "8472" natural silicone rubber, manufactured and sold by American Roller Company of Wisconsin, U.S.A. The natural silicone rubber had a hardness of 70 durometer shore A and roughness of $35 \times 10^{-6}$ to $45 \times 10^{-6}$ inches ($8.9 \times 10^{-5}$ to $11.4 \times 10^{-5}$ cm). The combined tooling with laminated poly(carbonate), PMMA, and PET layers, was then cooled with room temperature air, allowing the laminate materials to solidify. The laminated sample with replicated microcubes on one surface was removed from the tool.

A dual-layer sealing film was then laminated in line to the microcubes via thermal lamination as generally described in U.S. Patent Application No. 2007/024235 (Thakkar). The sealing film comprised two layers laminated together, the first layer comprised a 0.7 mil polyester loaded with 13% $TiO_2$, and the second layer (0.85 mil) comprised an amorphous co-polyester. The second layer was laminated adjacent the microcubes and was used to adhere the sealing film to the microstructure through a lamination process. The lamination process involved a rubber roll and a heated metal embossing roll with a chain-link raised pattern thereon, such as generally described in U.S. Pat. No. 4,025,159 (McGrath).

Comparative Example B

A second sample was produced according to the procedure described in Comparative Example A, except that the PET smoothing film was not used.

Example C

A master and a first generation negative tooling were produced as described in Comparative Example A, except that the first generation negative tooling was submitted to a surface treatment to create texture.

The first generation negative tooling was washed with "PREP L" neutral soap commercialized by Luster-On Products of Massachusetts, U.S.A., to activate the surface and improve anchorage of the nickel onto the substrate. Nickel was deposited using a plating rate of 8 amperes per square foot (ASF (86 A/m2)) for six minutes at a current of 225 A at 1.9 volts and temperature of about 135° F. (57.2° C.). The first generation negative tooling was removed from the plating bath, washed with abundant DI water, passivated with a 2% potassium dichromate solution, and electroformed to produce a first generation positive tooling as an archival copy. The first generation plated negative tooling was then re-immersed in the plating bath and plated for another six minutes using the same current, voltage, and temperature, for a total plating time of 12 minutes.

A second generation positive tooling was electroformed from the first generation negative tooling and used to produce a second generation plated negative tooling. Multiple copies of this second generation plated negative tooling were then turned into an endless belt and used to produce a third sample, following the procedure outlined in Comparative Example A.

Example D

The endless belt described in Example C was used to produce a fourth sample, according to the procedure described in Comparative Example A, except that the PET smoothing film was not used.

Example E

A second generation plated negative tooling was plated exactly as described in Example C. The electroformed second generation plated negative tooling was used to impart the pattern of the tool onto a polycarbonate film having a thickness of approximately 200 microns (0.0078 inch) and an index of refraction of about 1.59. A fifth sample was produced by using the second generation plated negative tooling in a compression molding press with smooth plates, as generally described in U.S. Pat. No. 6,843,571 (Sewall). The pressing was performed at a temperature of approximately 375° F. (191° C.) to 385° F. (196° C.), a pressure of approximately 1600 psi, and a dwell time of 20 seconds. The molded carbonate polycarbonate was then cooled to about 200° F. (100° C.) over 5 minutes. The resulting sample had a structured surface comprising a plurality of truncated cube corner elements.

The dual-layer sealing film was laminated to the cube corner elements of the sample through thermal lamination, as described in Comparative Example A.

Example F

A master and first generation negative tooling were produced as described in Comparative Example A. The first generation negative tooling was then submitted to a chemical etching treatment to create texture. Approximately 5 gallons (18.9 L) of an etching solution comprising 1% in volume of nitric acid (69%), 5% in volume of phosphoric acid (84%), and 94% in volume of deionized (DI) water, were added to an etching tank at room temperature. The tool was thoroughly washed with DI water and immersed in the etching solution for fifteen minutes and thirty seconds. The tool was then removed from the etching bath and rinsed with abundant DI water. The etched tool was subsequently washed with isopropyl alcohol and dried with compressed clean dry air.

A positive tooling was electroformed from the first generation etched negative tooling and used to produce a second generation etched negative tooling. This second generation etched negative tooling was used to produce a sixth sample in a compression molding press with smooth plates, followed by lamination of the dual-layer sealing film as described in Example E.

Example G

A first generation negative tooling was produced and etched as described in Example F, except that the tooling was immersed in the etching solution for two minutes. A seventh sample was produced using the first generation etched negative tooling in the compression molding press with smooth plates, followed by lamination of the dual-layer sealing film as described in Example E.

Example H

A first generation negative tooling was produced and etched as described in Example F, except that the tooling was immersed in the etching solution for four minutes. An eighth sample was produced using the first generation etched negative tooling in the compression molding press with smooth plates, followed by lamination of the dual-layer sealing film as described in Example E.

Example I

A first generation negative tooling was produced and etched as described in Example F, except that the tooling was immersed in the etching solution for eight minutes. A ninth sample was produced using the first generation etched negative tooling in the compression molding press with smooth plates, followed by lamination of the dual-layer sealing film, as described in Example E.

Example J

A positive tooling was electroformed from a first generation negative tooling as described in Comparative Example A. The positive tooling was then submitted to a plating process as described in Example C, except that the plating time was 12 minutes. A tenth sample was produced using the plated positive tooling in the compression molding press with smooth plates, followed by lamination of the dual-layer sealing film, as described in Example E.

Example K

The plated positive tooling of Example J was re-immersed in the plating solution after producing the tenth sample. The positive tooling was then submitted to a second round of plating for six minutes, for a total plating time of 18 minutes. An eleventh sample was produced using the plated positive tooling in the compression molding press with smooth plates, followed by lamination of the dual-layer sealing film, as described in Example E.

Example L

A first generation negative tooling was produced and etched as described in Example F, except that the tooling was immersed in the etching solution for six minutes. A twelfth sample was produced using the first generation etched negative tooling in the compression molding press with smooth plates, followed by lamination of the dual-layer sealing film, as described in Example E.

Example M

A first generation negative tooling was produced and etched as described in Example F, except that the tooling was immersed in the etching solution for nine minutes. A thirteenth sample was produced using the first generation etched negative tooling in the compression molding press with smooth plates, followed by lamination of the dual-layer sealing film, as described in Example E.

Example N

A first generation negative tooling was produced and etched as described in Example F, except that the tooling was immersed in the etching solution for twelve minutes. A fourteenth sample was produced using the first generation etched negative tooling in the compression molding press with smooth plates, followed by lamination of the dual-layer sealing film, as described in Example E.

Table I summarizes the Examples and samples prepared as described above.

TABLE I

Tabular Summary of Examples A-N

| Examples | Samples | Surface Treatment | Method of making article | PET film | Total duration of plating/ etching (min) | Dual-layer sealing film |
|---|---|---|---|---|---|---|
| Comparative Example A | 1 | None | Casting | Yes | 0 | Yes |
| Comparative Example B | 2 | None | Casting | No | 0 | Yes |
| Example C | 3 | Plating | Casting | Yes | 12 | Yes |
| Example D | 4 | Plating | Casting | No | 12 | Yes |
| Example E | 5 | Plating | Pressing | No | 12 | Yes |
| Example F | 6 | Etching | Pressing | No | 15.5 | Yes |
| Example G | 7 | Etching | Pressing | No | 2 | Yes |
| Example H | 8 | Etching | Pressing | No | 4 | Yes |
| Example I | 9 | Etching | Pressing | No | 8 | Yes |
| Example J | 10 | Plating | Pressing | No | 12 | Yes |
| Example K | 11 | Plating | Pressing | No | 18 | Yes |
| Example L | 12 | Etching | Pressing | No | 6 | Yes |
| Example M | 13 | Etching | Pressing | No | 9 | Yes |
| Example N | 14 | Etching | Pressing | No | 12 | Yes |

Figure 1B:
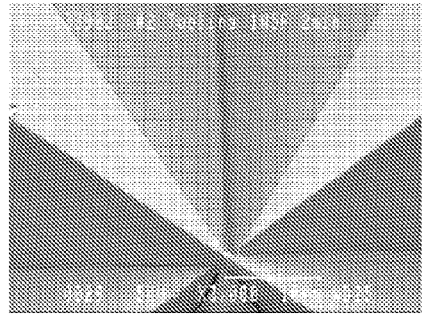
Figure 1C:
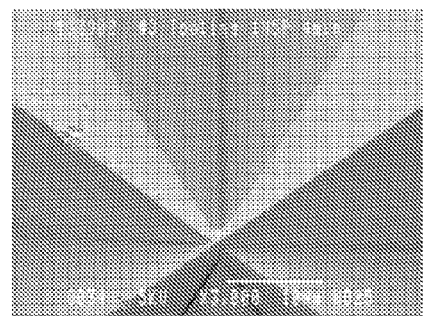
Figure 1D:
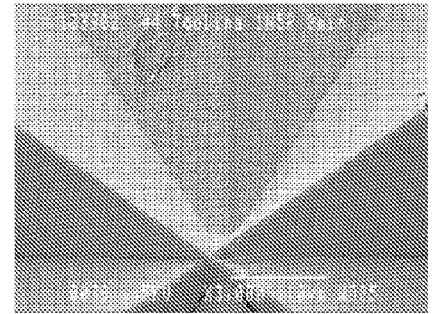
Figure 2A:
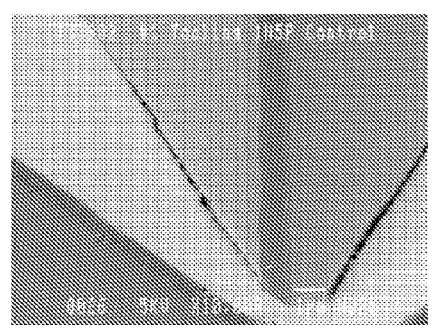
FIGS. 2a, 2b, 2c, and 2d are SEMs showing a portion of tooling made according to Examples Comparative A, G, H, and I, respectively, at a magnification of 10,000×.
Figure 2B:
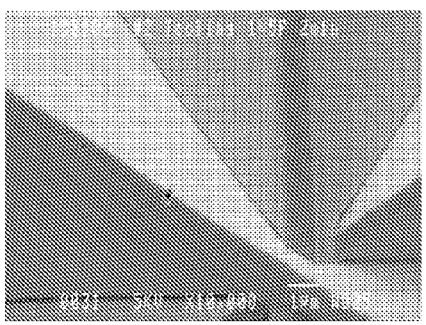
Figure 2C:
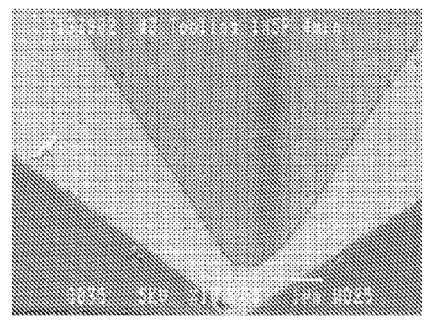
Figure 2D:
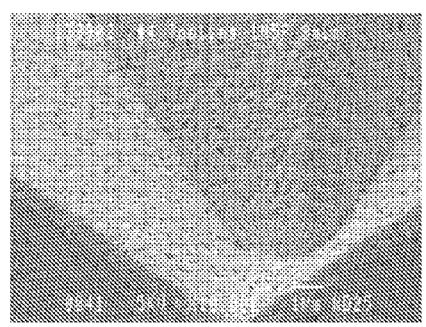

FIGS. 1a, 1b, 1c, and 1d are scanning electron micrographs (SEMs) showing a portion of tooling made according to Examples Comparative A, G, H, and I, respectively, at 3000×. More specifically, FIGS. 1a, 1b, 1c, and 1d show, at 3000× magnification, a cube corner in each of four pieces of tooling, one of which is a control (FIG. 1a) and three of which are etched (FIGS. 1b, 1c, and 1d). The tooling shown in FIG. 1a is an unetched control. The tooling shown in FIG. 1b was etched for two minutes in an etchant mixture of one percent nitric acid and five percent phosphoric acid. The tooling shown in FIG. 1c was etched for four minutes in an etchant mixture of one percent nitric acid and five percent phosphoric acid. The tooling shown in FIG. 1d was etched for eight minutes in an etchant mixture of one percent nitric acid and five percent phosphoric acid. These figures show that the longer the tooling is exposed to the etchant bath (or is etched), the greater the degree of etching on the tooling surface. In other words, increased surface roughness results from increased etch time.

FIGS. 2a, 2b, 2c, and 2d are SEMs showing a portion of tooling made according to Examples Comparative A, G, H, and I, respectively, at a magnification of 10,000×. FIGS. 2a, 2b, 2c, and 2d show the same samples as FIGS. 1a, 1b, 1c, and 1d, respectively, at different locations and at a higher magnification. The effects of etching to form submicron pits or depressions or divets in the nickel are apparent. These pits are generally absent in the unetched/control shown in FIG. 2a. Further, these pits increase in number and apparent size with increased etch time.

Figure 3A:
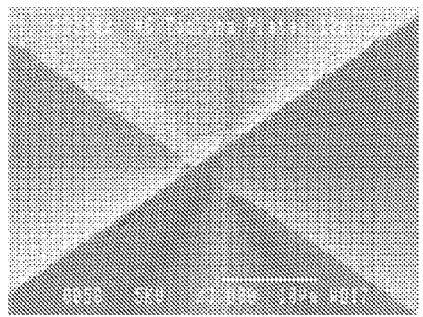
FIGS. 3a and 3b are SEMs showing a portion of tooling made according to Examples J and K, respectively, at a magnification of 3,000×.
Figure 3B:
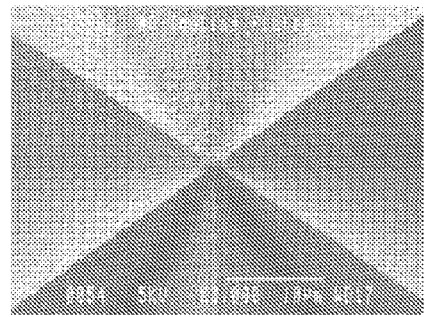

FIGS. 3a and 3b are SEMs showing a portion of tooling made according to Examples J and K, respectively, at a magnification of 3000×. More specifically, FIGS. 3a and 3b show, at 3000× magnification, a cube corner in each of two pieces of plated tooling, one of which has been plated for 12 minutes (FIG. 3a) and one of which has been plated for 18 minutes (FIG. 3b). All SEM images are of stampers copied from the positive tool. These SEMs show the effect of two different durations of plating onto a mother or positive image of the cube corner structure (cubes protruding). Increased amounts of nickel are deposited with increased plating time. Increased nickel deposits affect the surface structure and/or surface roughness, as increased surface roughness correlates to increased plating time. FIGS. 3a and 3b can be compared to FIG. 1a for a comparison of plated tooling versus an unplated, control tooling.

Figure 4A:
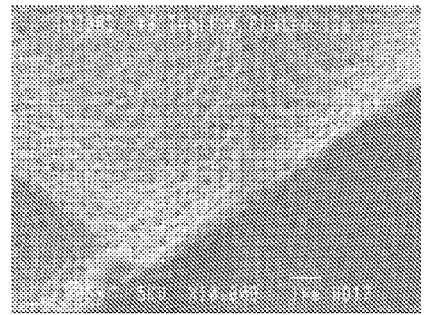
FIGS. 4a and 4b are SEMs showing a portion of tooling made according to Examples Comparative J and K, respectively, at a magnification of 10,000×.
Figure 4B:
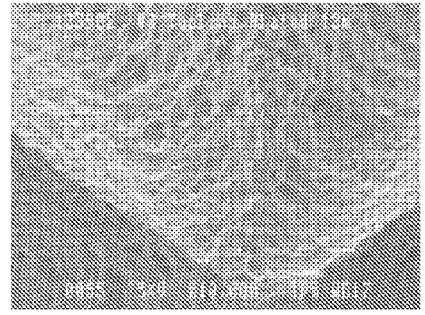

FIGS. 4a and 4b are SEMs showing a portion of tooling made according to Examples J and K, respectively, at a magnification of 10,000×. FIGS. 4a and 4b show the same samples as FIGS. 3a and 3b, respectively, at different locations and at a higher magnification. The effects of plating to form surface roughness are apparent. Further, it is also apparent that the surface roughness increases with increased plating.

Figure 5A:
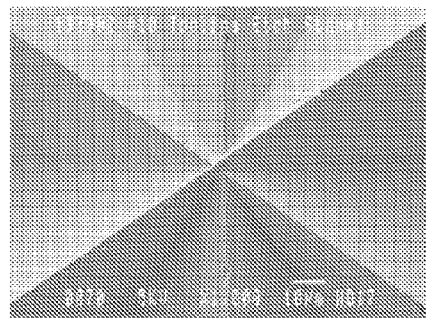
FIGS. 5a, 5b, and 5c are SEMs showing a portion of etched tooling made according to Example F, respectively, at magnifications of 1,000×, 3,000×, and 10,000×.
Figure 6A:
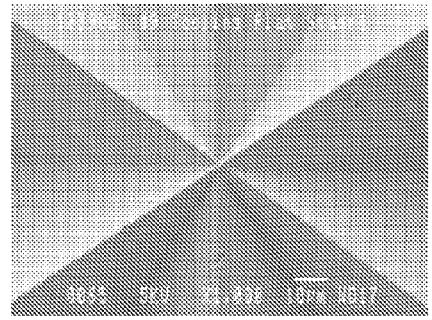
FIGS. 6a, 6b, and 6c are SEMs showing a portion of plated tooling made according to Example E, respectively, at magnifications of 1,000×, 3,000×, and 10,000×.
Figure 5B:
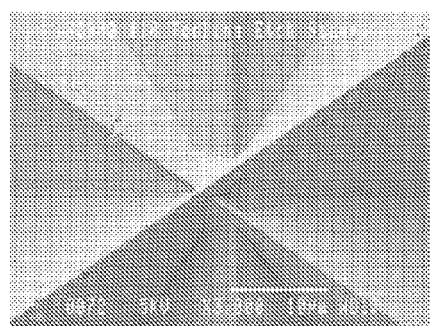
Figure 6B:
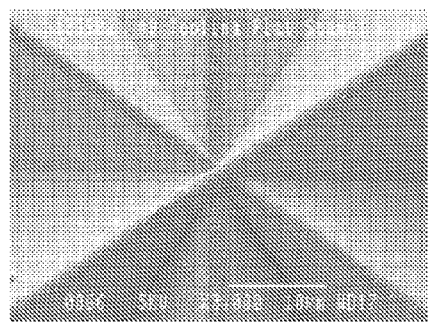
Figure 5C:
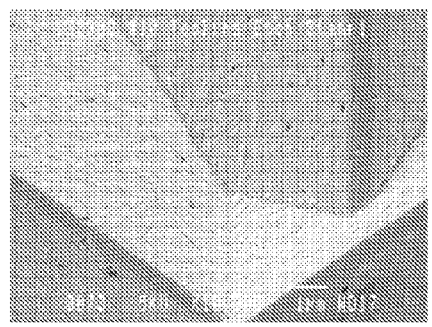
Figure 6C:
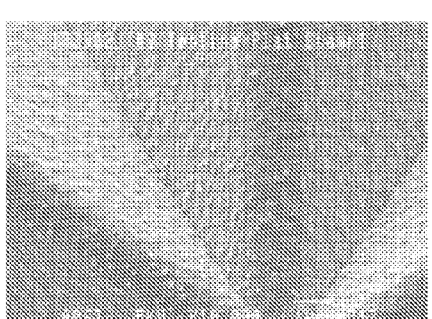

FIGS. 5a, 5b, and 5c are SEMs showing a portion of etched tooling made according to Example F, respectively, at magnifications of 1,000×, 3,000×, and 10,000×. FIGS. 6a, 6b, and 6c are SEMs showing a portion of plated tooling made according to Example E, respectively, at magnifications of 1,000×, 3,000×, and 10,000×. The detailed surface structures in the etched tools versus the plated tools are clearly different. However, the overall magnitude of the structures in the etched tooling and the plated tooling is very similar.

Figure 7:
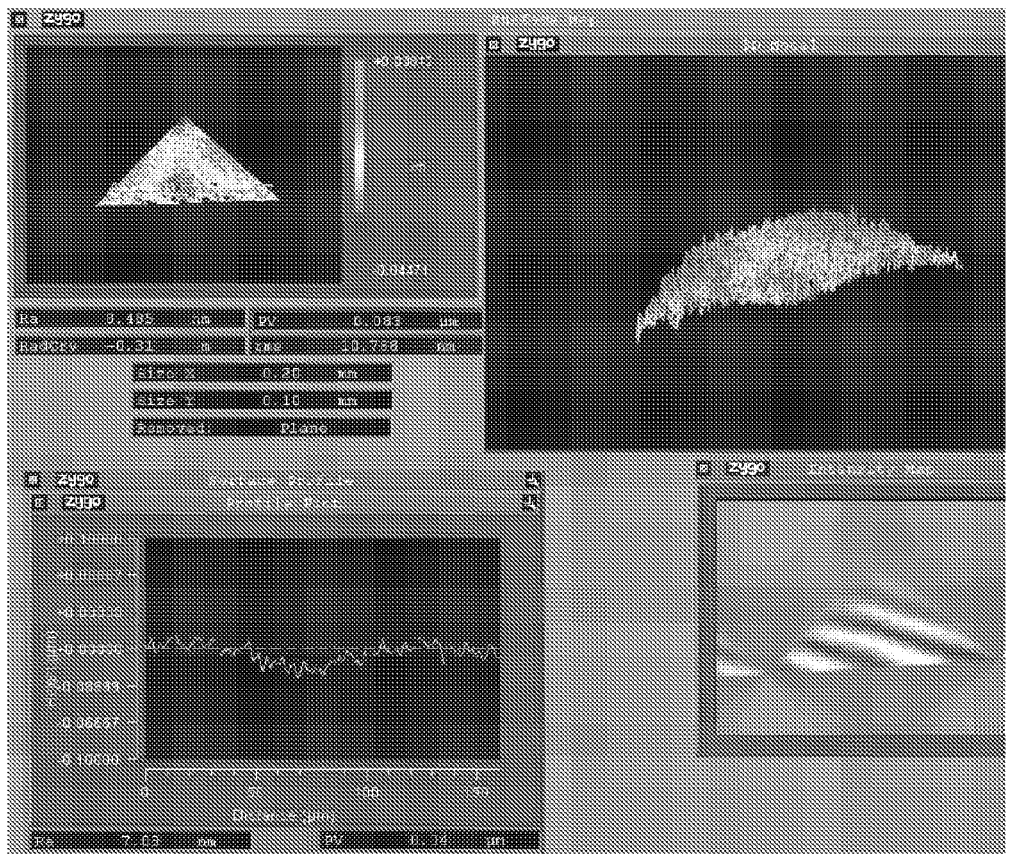
FIG. 7 is a screen shot from a surface profiler showing the 3D appearance of a cube face and the roughness data of a cross-sectional portion of the cube face.
Figure 8:
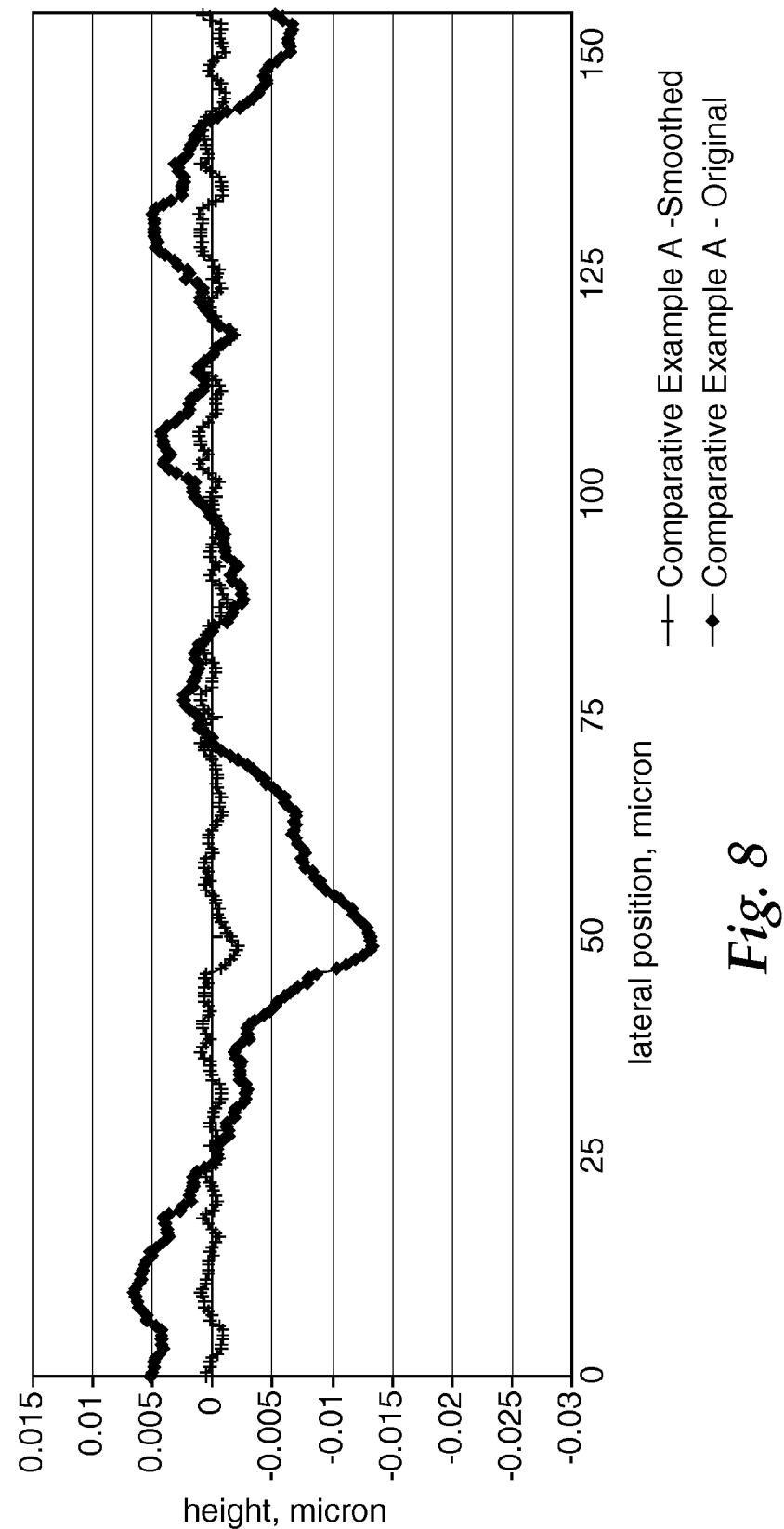
FIG. 8 is a graph showing the original and filtered surface roughness data from a tool made as described in Comparative Example A.
Figure 9:
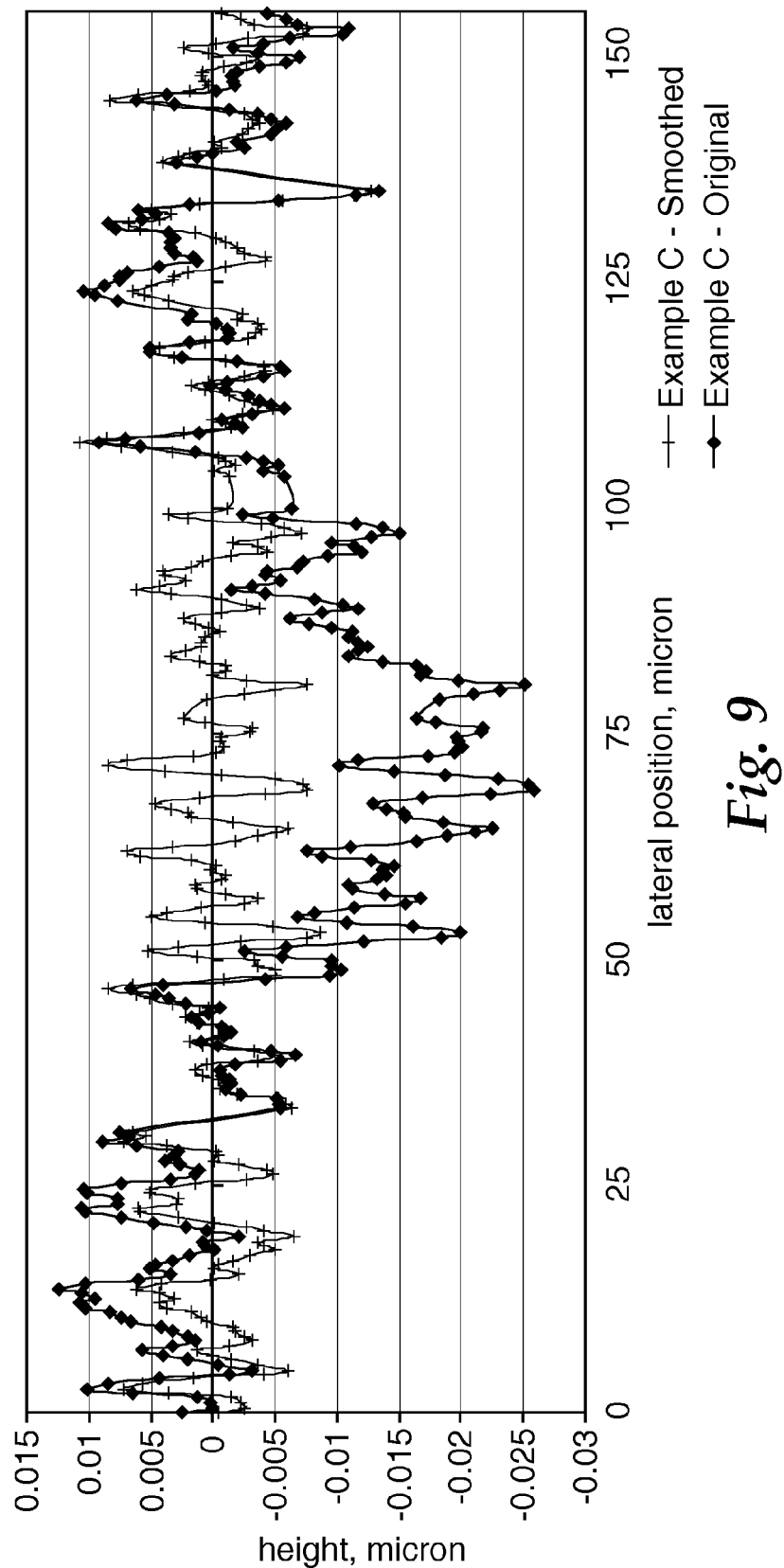
FIG. 9 is a graph showing the original and filtered surface roughness data from FIG. 7 for the tool made as described in Example C.

FIGS. 7-9 describe the surface roughness of the sheetings and tools of the present application. Specifically, FIG. 7 is a screen shot from a surface profiler showing the 3D appearance of a cube face and the roughness data of a cross-sectional portion of the cube face formed as described in Example C. In FIG. 7, a ZYGO® NewView 5000™ surface profiler running Metropro 7.11.1 software was used to measure the surface roughness of the cube surfaces for treated tooling. Negative nickel copies of each tooling sample were tipped so that the primary groove surface was horizontal. Measurements were then taken on a cube face which was a portion of the primary groove surface as shown generally in FIG. 7. A 20× Mirau objective was utilized and the NewView 5000™ was calibrated using the known size of the cube face.

A slice about 150 microns in length was taken near the base of the cube face as shown in the top left portion of FIG. 7. The surface roughness slice was taken in regions generally representative of the overall roughness of the cube face. The XY data as shown in the profile plot was saved to a file for further analysis. Replica measurements were taken for three neighboring cube faces. The small scale texture or roughness of the cube facets as well as some surface form and curvature are generally apparent. The XY data from the profile plot was imported in to a spreadsheet for further analysis and plotting. Results of this analysis for wavelength (microns) and $R_a$ (microns) are summarized in Table II below.

TABLE II

Summary of XY Data from the Surface Profiler

| Example | Ra (◇) | Wavelength (◇) |
|---------|--------|----------------|
| A | 0.00051 | 3.91 |
| L | 0.00175 | 3.68 |
| M | 0.00307 | 3.41 |
| C | 0.00316 | 3.38 |
| F | 0.00333 | 3.68 |
| N | 0.00527 | 3.27 |

The average separation between small scale roughness peaks was calculated to determine average wavelength of the surface roughness. Wavelength was between 3 and 4 microns for all samples. Surface form and curvature were removed from the data in order to specifically study variations in small scale roughness between samples. A moving average of 20 neighboring data points, which spanned about 10 microns or three wavelengths, was subtracted from the XY data. Removal of or filtering with this moving average allowed calculation of $R_a$ associated with the small scale surface roughness. Selection of a window size of about three wavelengths to calculate the moving average allows removal of curvature and surface form of the cube facets without loss of surface roughness or texture data.

FIG. 8 shows the XY data before and after the moving average correction for a cube surface of Comparative Example A. The number n of data points was 301 covering a slice length L of 157.9 microns. Comparative Example A represents the relatively smooth surface of a standard cube corner face in an untreated nickel tool. $R_a$ (arithmetical mean deviation) was calculated numerically for the smoothed data according to the following equation where Z(x) represents the vertical position of the smoothed data as a function of lateral position and the summation is taken over the total number of data points n. The average $R_a$ ($R_a = (1/L)\Sigma Z(x)\Delta x$) of 0.00051 microns was averaged from three different measurements and is summarized in Table II.

FIG. 9 shows the XY data before and after the moving average correction for a cube surface of Example C. The number n of data points was 284 covering a slice length L of 159.9 microns. Example C represents a nickel tool which was submitted to a surface treatment to create texture. The roughness is significantly higher in Example C relative to the untreated tool in Comparative Example A. The average $R_a$ of 0.00316 microns was averaged from three different measurements and is summarized in Table II. The data in Table II illustrates the increasing surface roughness $R_a$ which results from using surface treatments to create texture on cube corner surfaces.

Figure 10:
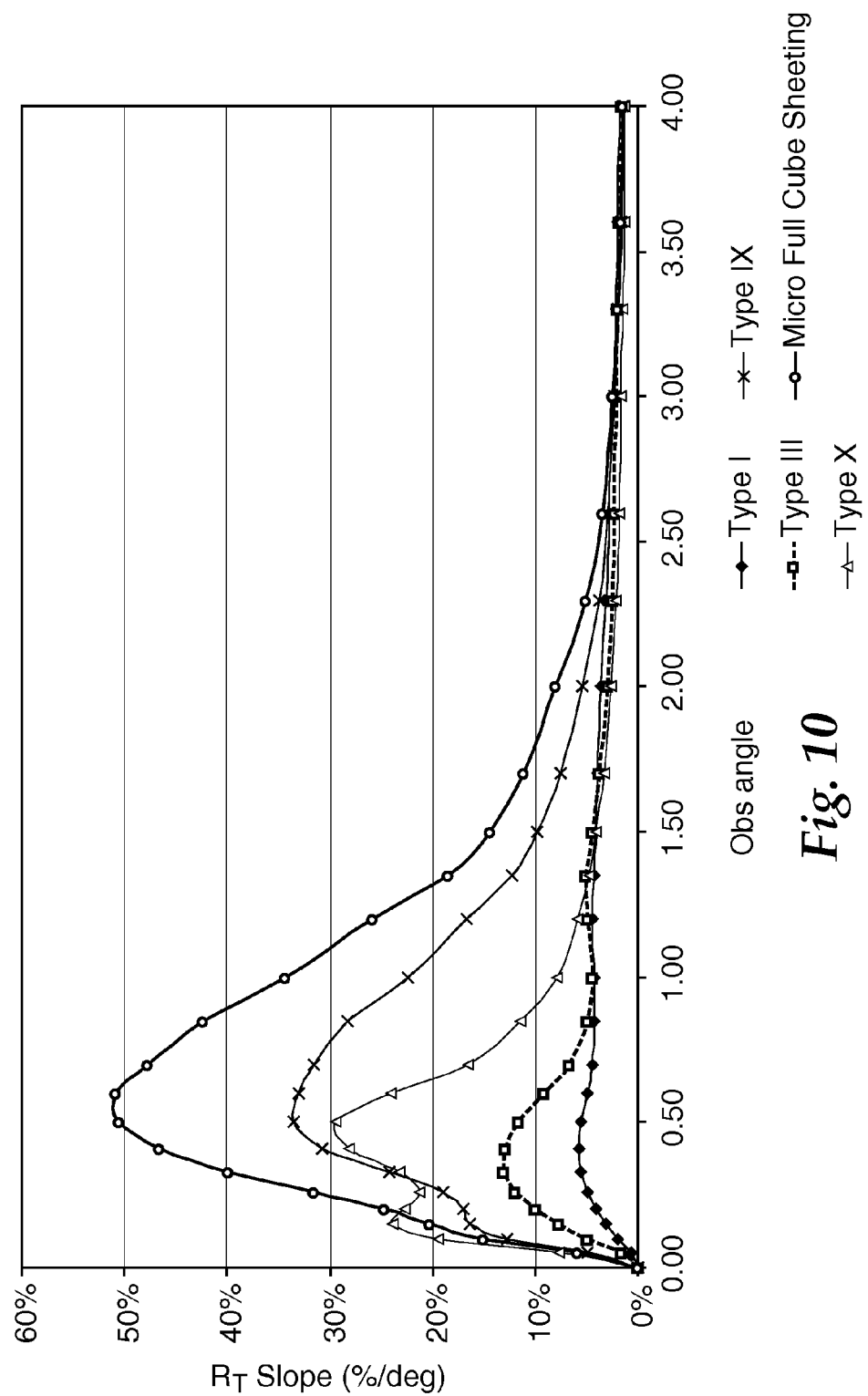
FIG. 10 is a graph showing the optical performance of various types of commercially available sheeting.

FIG. 10 is a graph showing the optical performance of various types of commercially available sheeting. The Type I sheeting is engineer grade sheeting manufactured by 3M Company of St. Paul, Minn.; the Type III sheeting is beaded sheeting manufactured by 3M Company of St. Paul, Minn.; the Type IX sheeting is VIP 3990 sheeting manufactured by 3M Company of St. Paul, Minn.; the Type X sheeting is HIP sheeting manufactured by 3M Company of St. Paul, Minn.; and the Micro Full Cube Sheeting, proposed Type XI, is $DG^3$ sheeting manufactured by 3M Company of St. Paul, Minn. Type I sheeting has a lower $R_T$ Slope peak (less than 10%) than the other types of commercially available sheeting. Further, all of the commercially available prismatic sheetings have $R_T$ Slope peaks that are well over 20%.

Figure 11A:
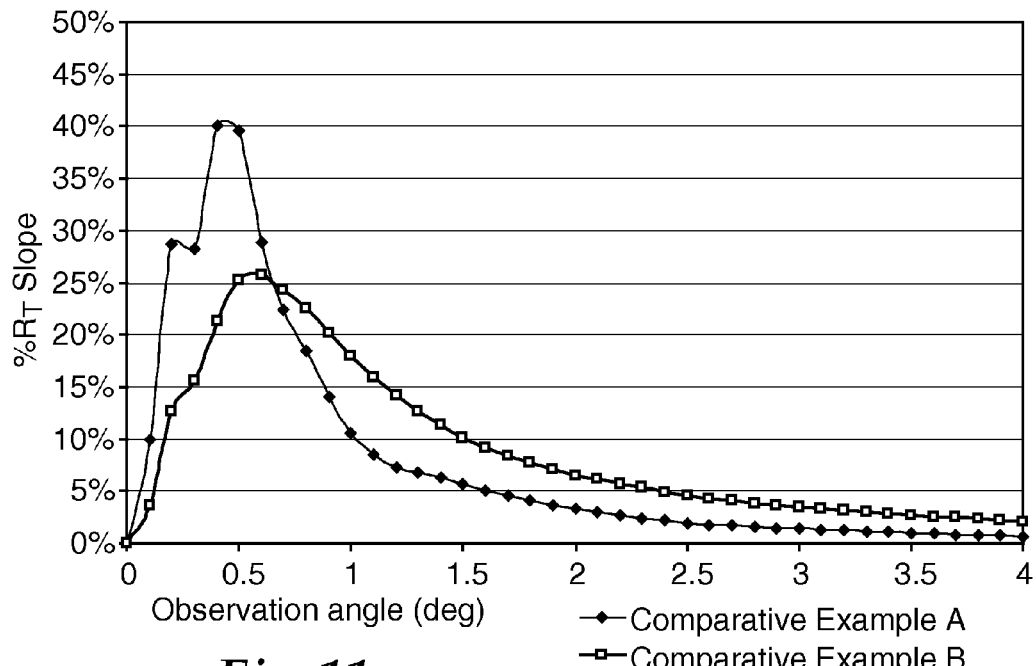
FIG. 11a shows the % Rt Slope for the film of comparative Example A compared to the film of Comparative Example B.
Figure 11B:
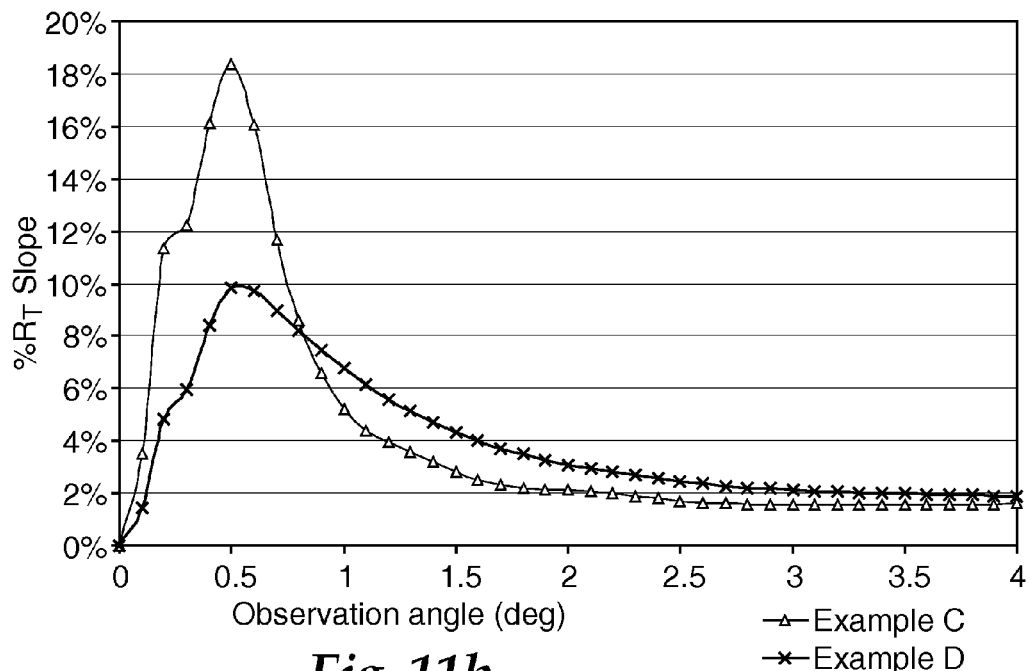
FIG. 11b shows the % Rt Slope for the film of Example C compared to the film of Example D.
Figure 11C:
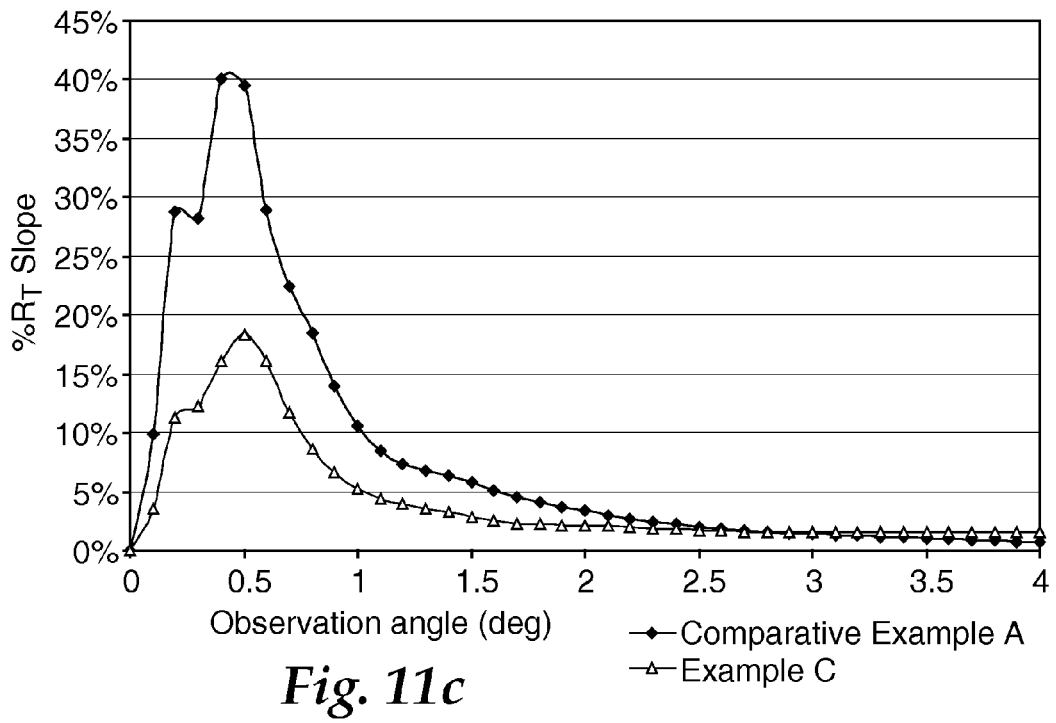
FIG. 11c shows the % Rt Slope for the film of Example C compared to the film of Comparative Example A.
Figure 11D:
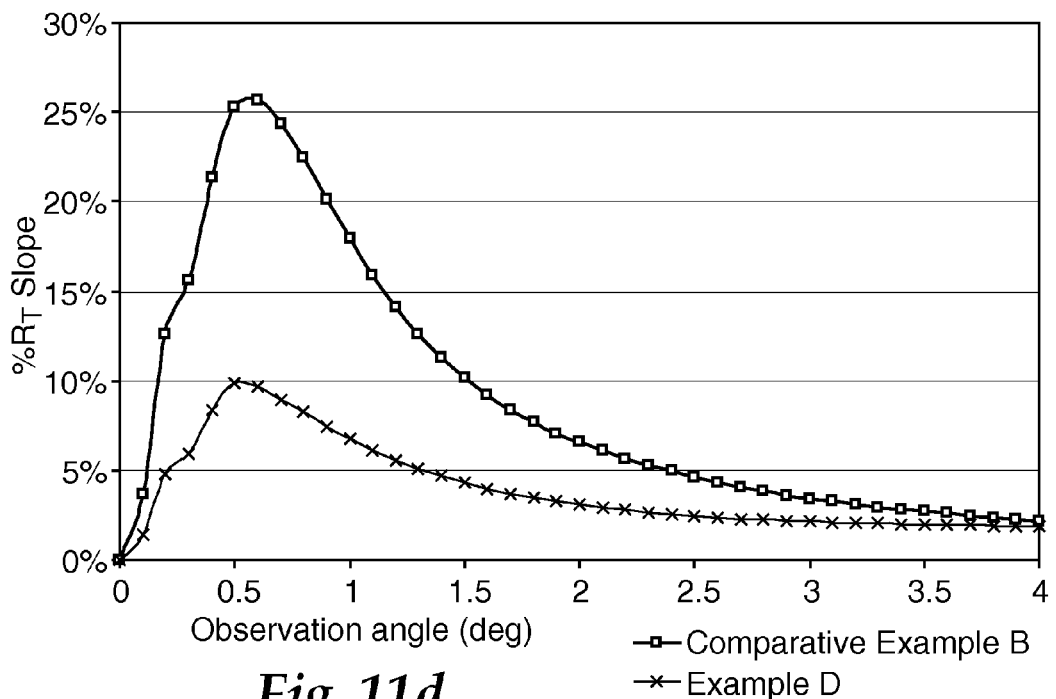
FIG. 11d shows the % Rt Slope for the film of Example D compared to the film of Comparative Example B.

FIG. 11a shows the % $R_T$ Slope for a commercially available film (983-10 manufactured by 3M Company of St. Paul, Minn.) (Comparative Example A) as compared to the commercially available film without a smoothing film (Comparative Example B). FIG. 11b shows the % $R_T$ Slope for the film of Example C compared to the film of Example D. FIG. 11c shows the % $R_T$ Slope for the film of Example C compared to the film of Comparative Example A. FIG. 11d shows the % $R_T$ Slope for the film of Example D compared to the film of Comparative Example B. FIG. 11a show that the use of a smoothing film spreads the light return over many observation angles (see also, e.g., FIG. 7 of PCT Publication No. WO9630786) or removal of the smoothing film causes light to be shifted from low to high observation angles. Plating and/or etching the tool, on the other hand, decreases light return over the full range of observation angles.

Figure 12A:
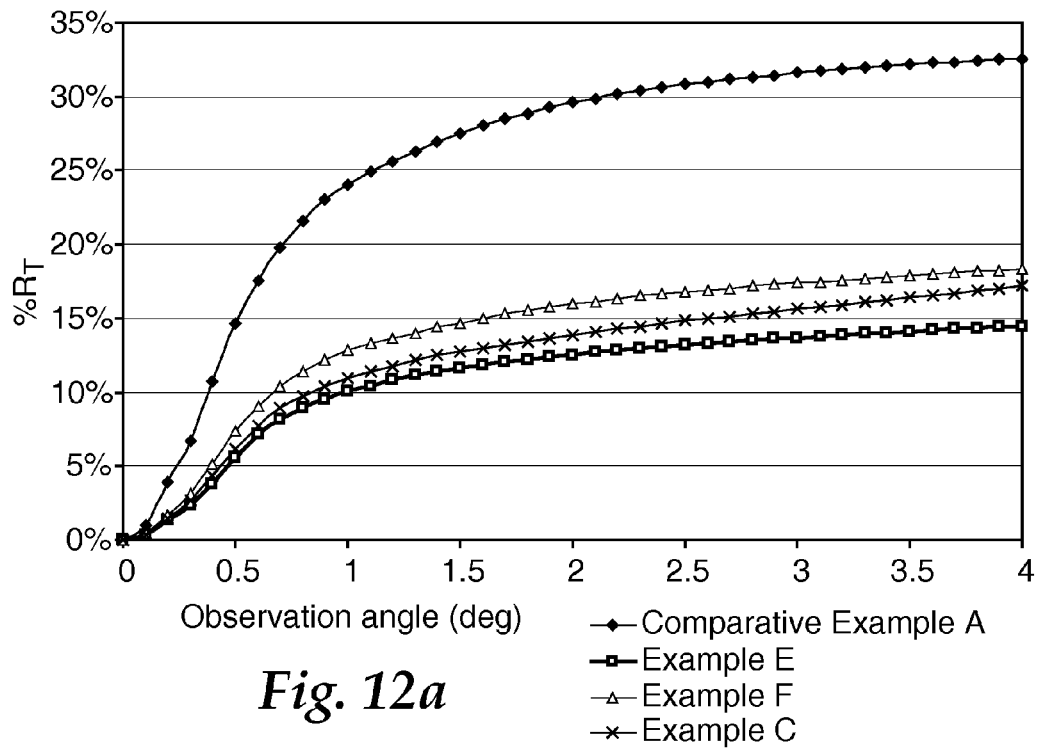
FIGS. 12a and 12b are graphs showing, respectively, the % Rt and % Rt Slope of the tools made in Examples Comparative A, E, F, and C, respectively.
Figure 12B:
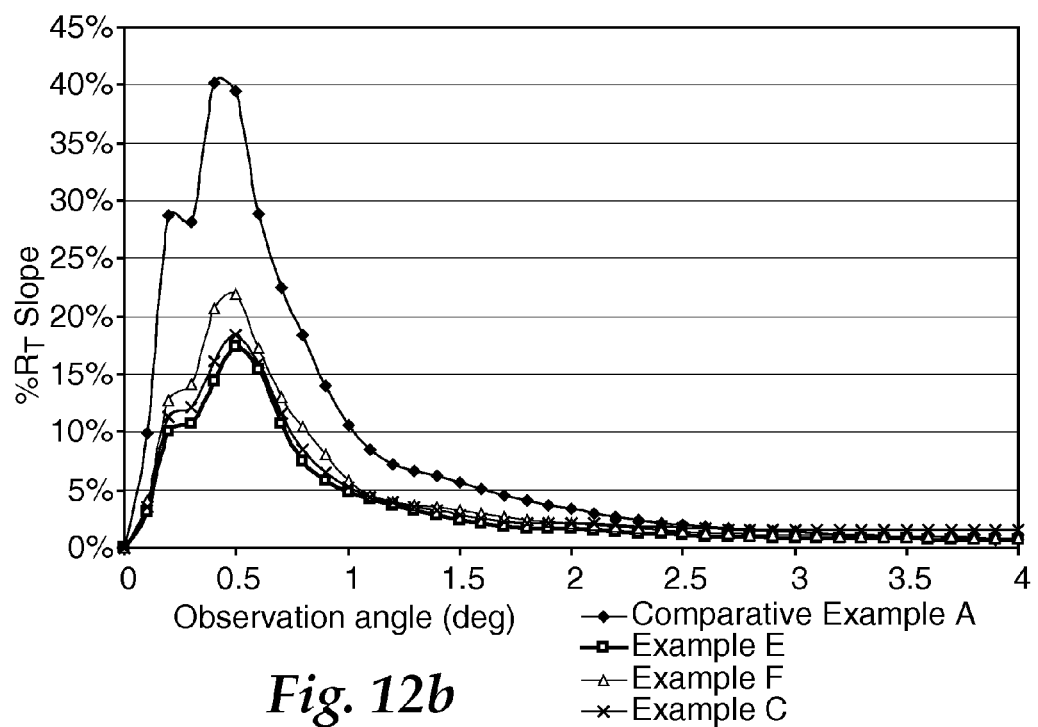

FIGS. 12a and 12b are graphs showing, respectively, the % $R_T$ and % $R_T$ Slope of the sheeting made in Examples Comparative A, E, F, and C, respectively. These Examples and graphs show two different approaches to introducing surface texture or roughness. First, FIGS. 12a and 12b show that both plating and etching cause total light return to decrease fairly uniformly over all observation angles. Second, FIGS. 12*a* and 12*b* show that although two quite different approaches were used to texturize the tools, the resulting sheetings exhibit similar performance. Third, FIGS. 12*a* and 12*b* show the reproducibility of the methods of the present application. Specifically, although the sheetings made in Examples E and C were made using different methods of replicating product from essentially the same tooling, and the graphs show similar performance. Thus introduction of a structure/feature/pit/depression/texture into/onto the tooling and then reliably replicating that structure provides the desired end results. So production of tooling with decreased brightness allows one to form sheeting with decreased brightness time and again with minimal fluctuation during manufacturing.

Figure 13A:
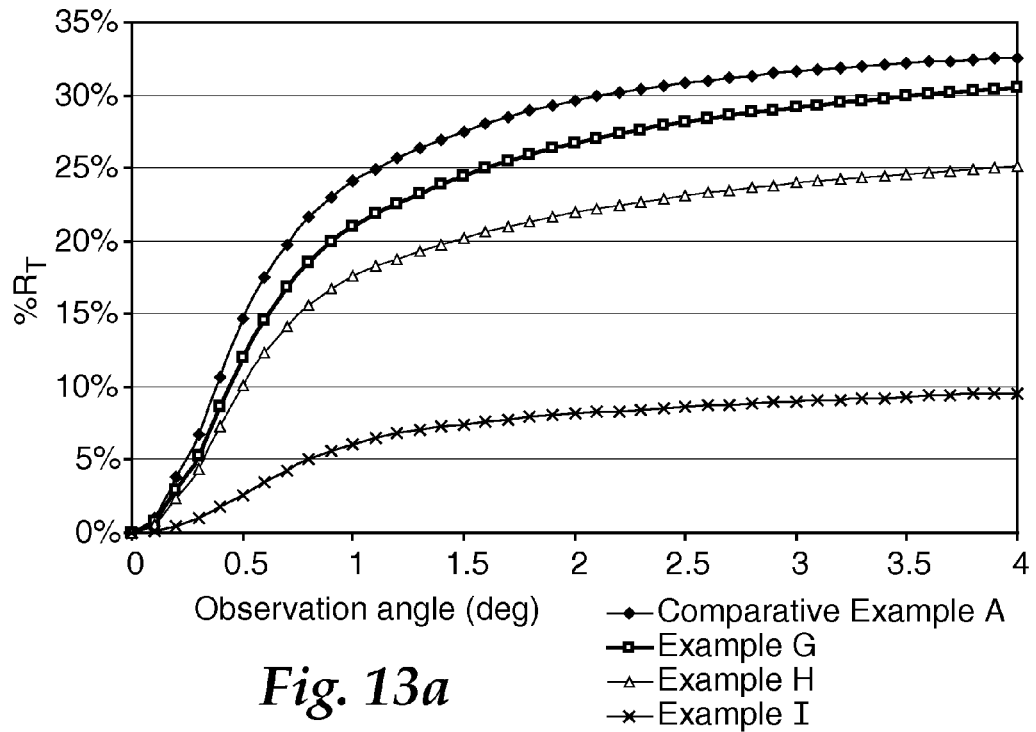
FIGS. 13a and 13b are graphs showing, respectively, the % Rt and % Rt Slope of, respectively, the tools made in Examples Comparative A, G, H, and I.
Figure 13B:
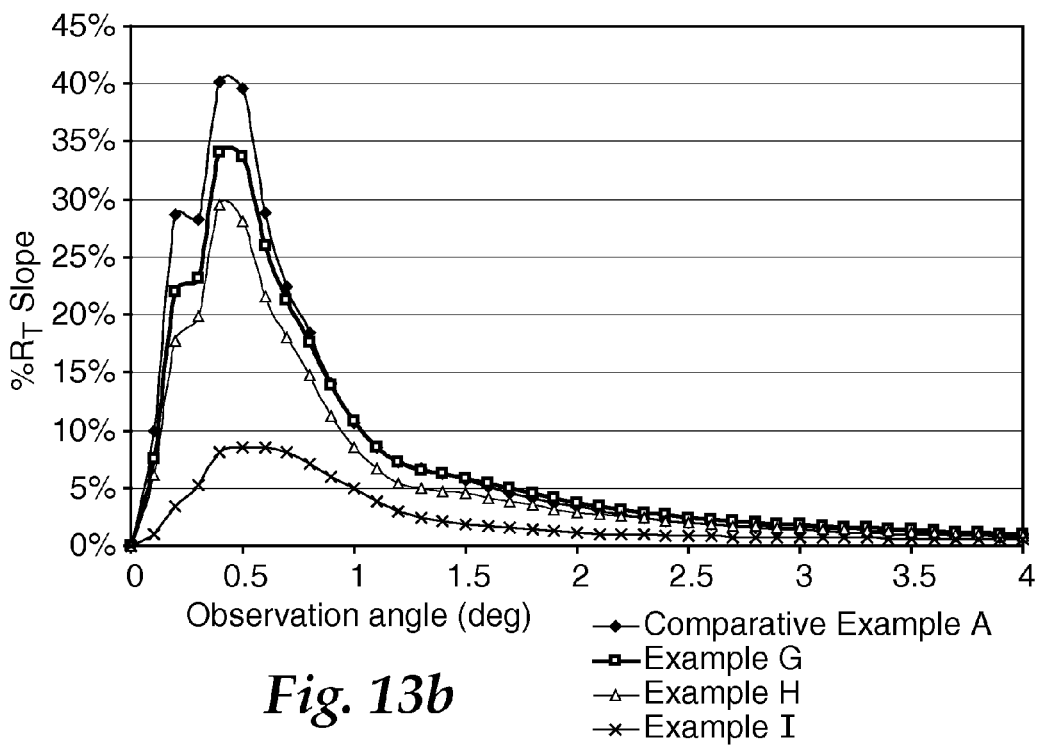

FIGS. 13*a* and 13*b* are graphs showing, respectively, the % $R_T$ and % $R_T$ Slope of, respectively, retroreflective sheetings made as described in Examples Comparative A, G, H, and I. FIG. 13*a* shows that the general optical performance varies with etch time. Thus, the general shape of the optical performance curve of each sheeting does not shift the light with respect to observation angle with increased etch time; instead the amount of light over all observation angles decreases. FIGS. 13*a* and 13*b* also show that the etching process may/can be nonlinear. Because there may be variations in, for example, the nickel surface chemistry, nickel surface structure, temperature, agitation, and the etching solution, the amount of time to etch or plate to get the desired results may vary. FIG. 13*b* shows that the % $R_T$ Slope peak for all of these exemplary sheetings is around 0.5 degree observation angle. The position of the % $R_T$ Slope peak does not change significantly with increased etch time; the magnitude of the % $R_T$ Slope decreases with increased etch time. Plating and/or etching the tool, on the other hand, decreases light return over the full range of observation angles.

Figure 14A:
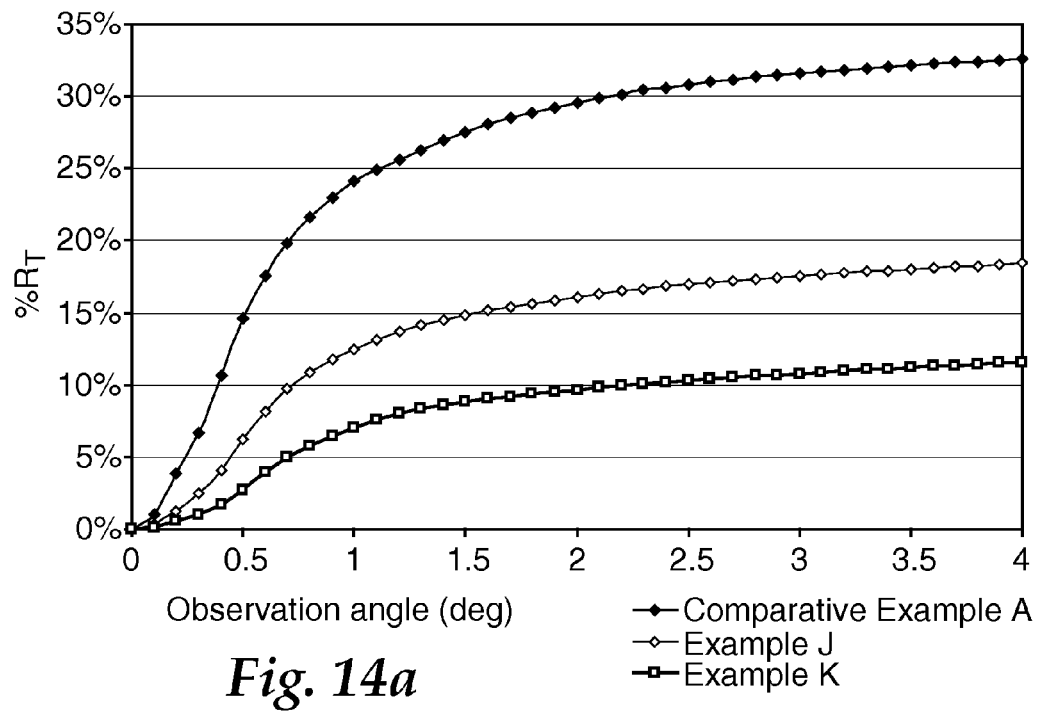
FIGS. 14a and 14b are graphs showing, respectively, the % Rt and % Rt Slope of, respectively, the retroreflective sheeting made in Examples Comparative A, J, and K.
Figure 14B:
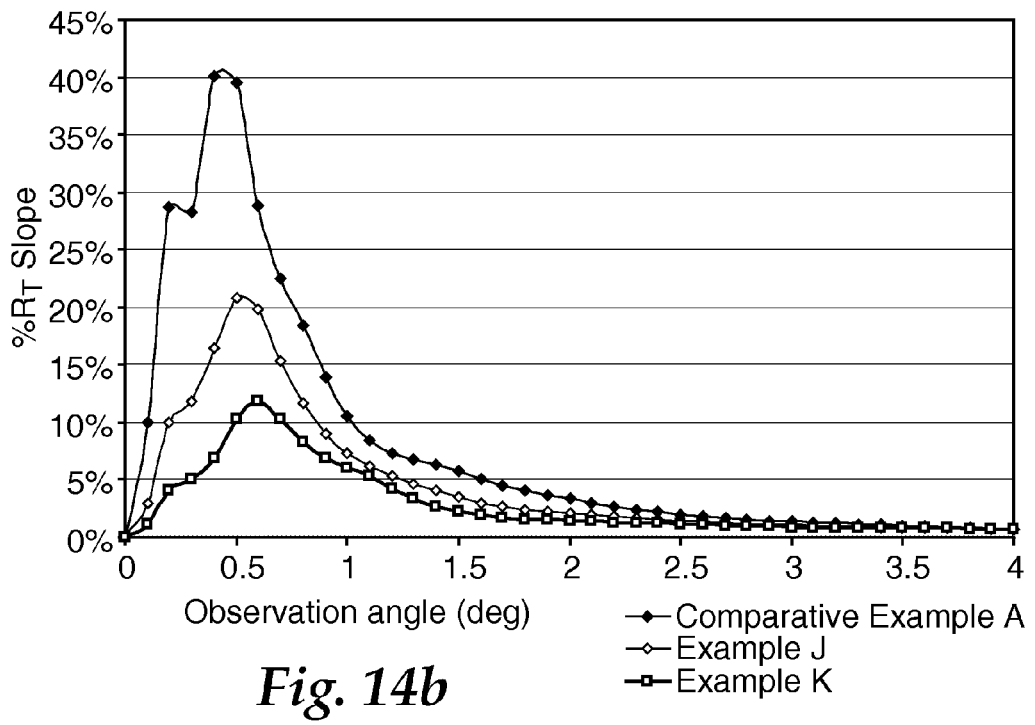

FIGS. 14*a* and 14*b* are graphs showing, respectively, the % $R_T$ and % $R_T$ Slope of, respectively, the retroreflective sheeting made in Examples Comparative A, J, and K. FIG. 14*a* shows that the shape of the optical performance curve for each sheeting is substantially the same. Thus, the general shape of the optical performance curve of each sheeting does not change significantly with increased plating time; however, the magnitude decreases with increased plating time. FIG. 14*b* shows that the % $R_T$ Slope peak for all of these sheetings is around 0.5 degree observation angle. The position of the % $R_T$ Slope peak does not change significantly with increased plating time; the magnitude of the % $R_T$ Slope decreases with increased plating time. Plating and/or etching the tool, on the other hand, decreases light return over the full range of observation angles. Example K has peak % $R_T$ Slope of 11.78% at 0.6 degree observation angle, which would be one exemplary sheeting that would meet the ASTM II requirements.

Figure 15A:
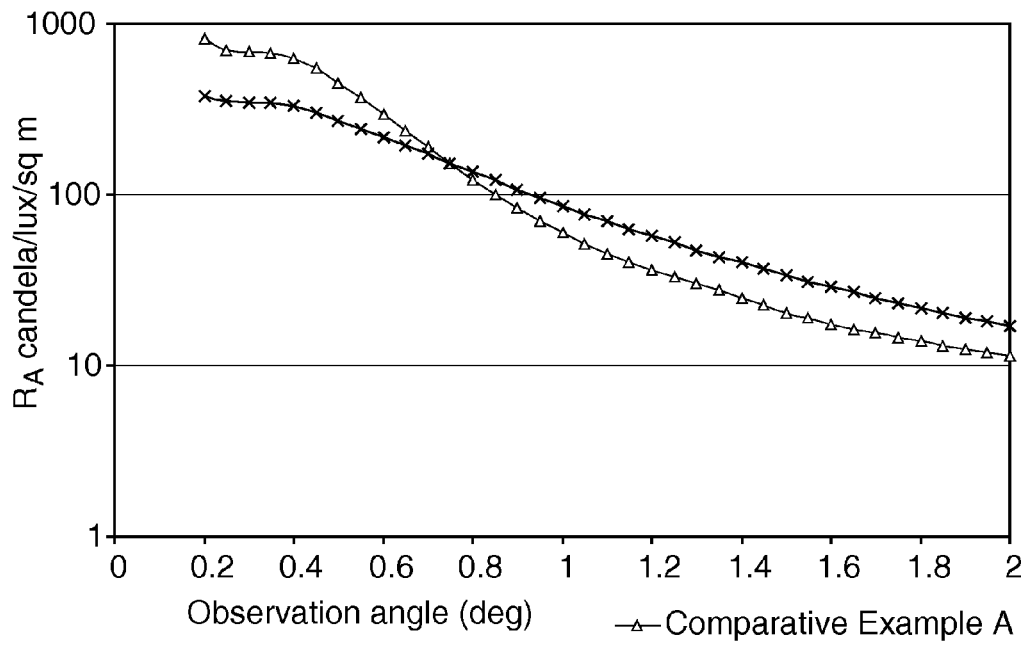
FIG. 15a is a graph showing the Ra of the retroreflective sheeting made as described in Comparative Example A and Comparative Example B.
Figure 15B:
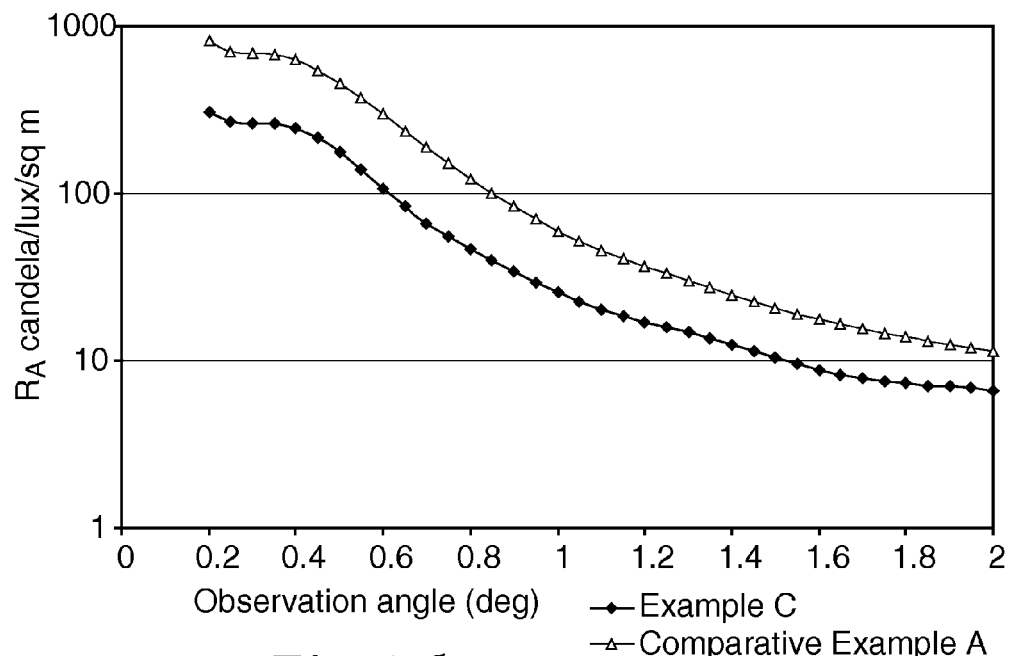
FIG. 15b is a graph showing the Ra of the retroreflective sheeting made as described in Example C and Comparative Example A.
Figure 15C:
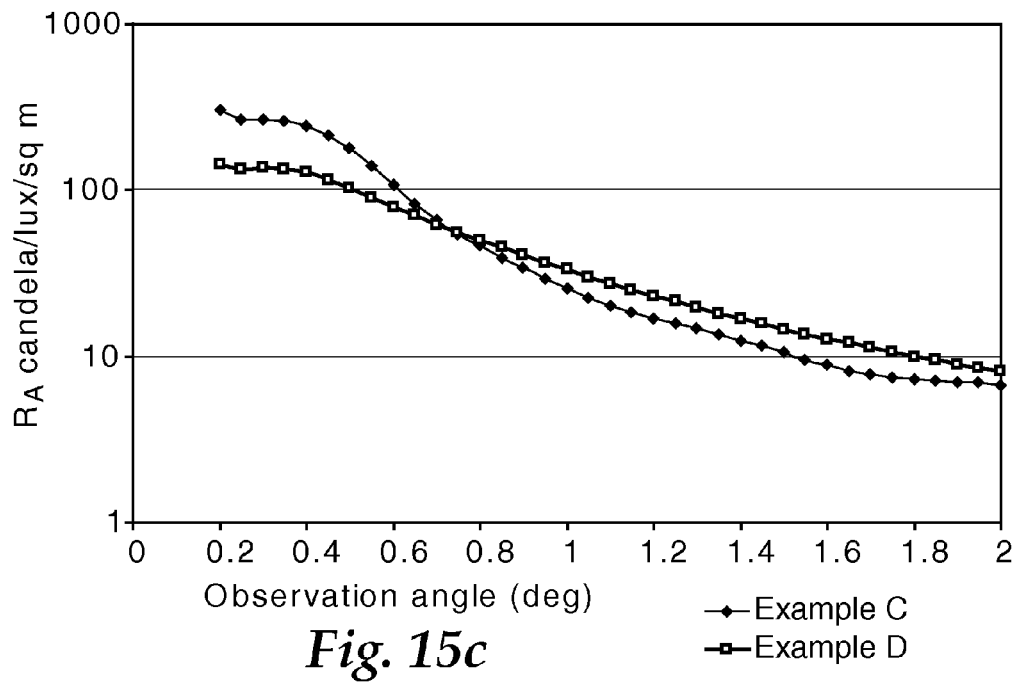
FIG. 15c is a graph showing the Ra of the retroreflective sheeting made as described in Examples C and D.
Figure 15D:
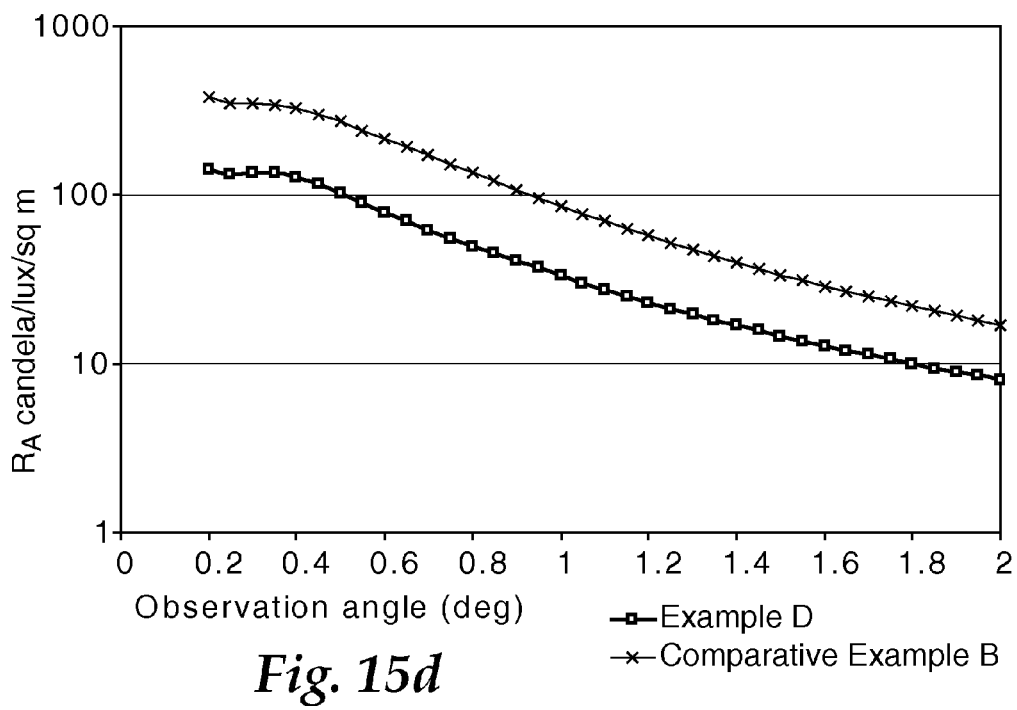
FIG. 15d is a graph showing the Ra of the retroreflective sheeting made as described in Example D and Comparative Example B.

FIG. 15*a* is a graph showing the $R_A$ of the retroreflective sheeting made as described in Comparative Example A and Comparative Example B. FIG. 15*b* is a graph showing the $R_A$ of the retroreflective sheeting made as described in Example C and Comparative Example A. FIG. 15*c* is a graph showing the $R_A$ of the retroreflective sheeting made as described in Examples C and D. FIG. 15*d* is a graph showing the $R_A$ of the retroreflective sheeting made as described in Example D and Comparative Example B. FIGS. 15*a* and 15*c* show the effects of inclusion or exclusion of a smoothing film. Specifically, exclusion of a smoothing film shifts light from low to high observations angles. FIGS. 15*b* and 15*d* show the effect of forming sheeting using texturized tooling—which is that brightness of the sheeting is decreased.

Figure 16A:
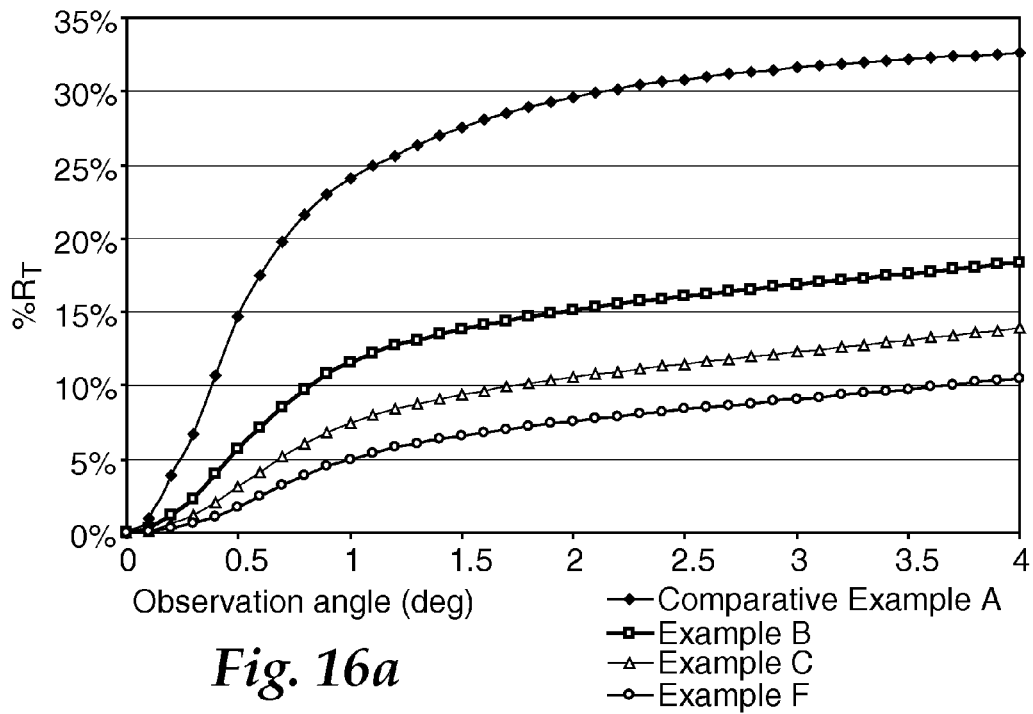
FIGS. 16a and 16b are graphs showing, respectively, the % Rt and % Rt Slope of the tools made in Examples Comparative A, L, M, and N, respectively.
Figure 16B:
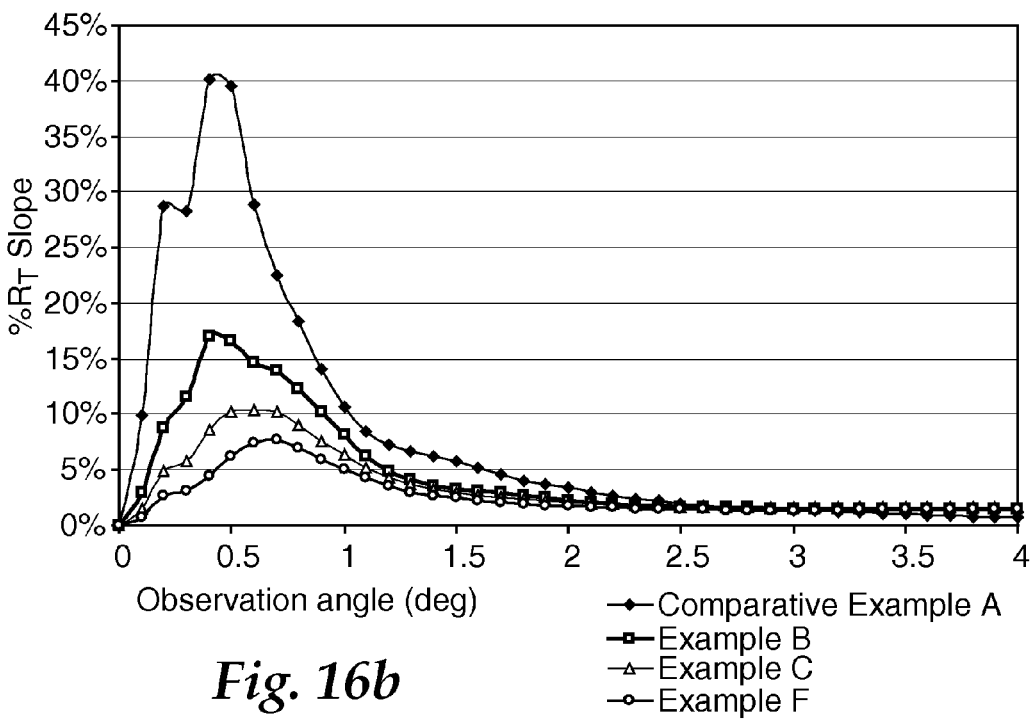

FIGS. 16*a* and 16*b* are graphs showing, respectively, the % Rt and % Rt Slope of the tools made in Examples Comparative A, L, M, and N, respectively. FIG. 16*a* shows that the general optical performance varies with etch time. Thus, the general shape of the optical performance curve of each sheeting does not shift the light with respect to observation angle with increased etch time; instead the amount of light over all observation angles decreases. FIG. 16*b* shows that the % $R_T$ Slope peak for all of these sheetings is between about 0.5 degrees and 0.7 degrees in observation angle. The magnitude of the % $R_T$ Slope decreases with increased etch time. Plating and/or etching the tool decreases light return over the full range of observation angles. A comparison of FIGS. 16*a* and 16*b* with FIGS. 13*a* and 13*b* shows that similar performance is seen with differing etch times based on the factors discussed above.

Table III shows the optical performance of various sheetings of the present application.

TABLE III

Summary of Optical Performance of Examples.

| $R_a$ (μ) | Examples | | |
|---|---|---|---|
| 0.00051 | A | G | I |
| 0.00175 | B | | |
| 0.00307 | C | | |
| 0.00316 | D | | |
| 0.00333 | E | H | J |
| 0.00527 | F | | |
| | Max % $R_T$ Slope | | |
| 0.00051 | 40.12% | 25.64% | 45.84% |
| 0.00175 | 17.02% | | |
| 0.00307 | 10.43% | | |
| 0.00316 | 21.87% | | |
| 0.00333 | 17.41% | 9.87% | 18.39% |
| 0.00527 | 7.66% | | |
| | $R_A$ Average 0.2 obs, −4 entrance | | |
| 0.00051 | 688 | 378 | 827 |
| 0.00175 | 261 | | |
| 0.00307 | 139 | | |
| 0.00316 | 337 | | |
| 0.00333 | 269 | 143 | 305 |
| 0.00527 | 75 | | |

Comparative Example O

A master tool and first generation negative tooling were prepared as described in Comparative A except that the plating conditions were adjusted to produce a part with compressive stresses resulting in −0.115 degrees of primary groove angle deviation as compared to the design target of Comparative Example A.

A second generation positive tooling was electroformed from the first generation negative tooling and used to produce a 54 in. (137.16 cm) by 54 in. (137.16 cm) second generation negative tooling. The second generation negative tooling was cut using a standard metal shear producing first, second and third parts of 6 in. (15.24 cm) by 10 in. (25.4 cm). Sample 15 was produced using the first part of the tooling in the compression molding press with smooth plates followed by lamination of the dual-layer sealing film, as generally described in Example E.

Example P

The second part of the tooling of Example O was submitted to the chemical etching treatment of Example F for 6 minutes.

Sample 16 was produced using the etched second part in the compression molding press with smooth plates followed by lamination of the dual-layer sealing film, as generally described in Example E.

Example Q

The third part of the tooling of Example O was submitted to the chemical etching treatment of Example F for 8 minutes. Sample 17 was produced using the etched third part in the compression molding press with smooth plates followed by lamination of the dual-layer sealing film, as generally described in Example E.

Comparative Example R

A master tool and first generation negative tooling were prepared as described in Comparative Example O except that the primary groove angle deviation as compared to the design target of Comparative Example A was of approximately −0.111 degrees. A second generation negative tooling was produced as described in Comparative Example O and cut using the standard metal shear in first and second parts of 6 in. (15.24 cm) by 10 in. (25.4 cm). Sample 18 was produced using the first part of the tooling in the compression molding press with smooth plates followed by lamination of the dual-layer sealing film, as generally described in Example E.

Example S

The second part of the tooling of Example R was submitted to the chemical etching treatment of Example F for 8 minutes. Sample 19 was produced using the etched second part in the compression molding press with smooth plates followed by lamination of the dual-layer sealing film, as generally described in Example E.

Comparative Example T

A master tool and first generation negative tooling were prepared as described in Comparative Example O except that the primary groove angle deviation as compared to the design target of Comparative Example A was of approximately −0.008 degrees.

A second generation negative tooling was produced as described in Comparative Example O and cut using the standard metal shear in first and second parts of 6 in. (15.24 cm) by 10 in. (25.4 cm). Sample 20 was produced using the first part of the tooling in the compression molding press with smooth plates followed by lamination of the dual-layer sealing film, as generally described in Example E.

Example U

The second part of the tooling of Example T was submitted to the chemical etching treatment of Example F for 6 minutes. Sample 21 was produced using the etched second part in the compression molding press with smooth plates followed by lamination of the dual-layer sealing film, as generally described in Example E.

Example V

A master tool and first generation negative tooling were prepared as described in Comparative Example O except that the primary groove angle deviation as compared to the design target of Comparative Example A was of approximately −0.125 degrees. The first generation negative tooling was submitted to the chemical etching treatment of Example F for 7.75 minutes. A second generation positive tooling was electroformed from the first generation etched negative tooling and used to produce a second generation etched negative tooling. Multiple copies of this second generation etched negative tooling were then turned into an endless belt and used to produce Sample 22, as generally described in Comparative Example A. No PET film was used for Sample 22.

Example W

The second generation etched negative tooling of Example V was used. Sample 23 was produced using the second generation etched negative tooling in a compression molding press with smooth plates followed by lamination of the dual-layer sealing film, as generally described in Example E.

Table IV summarizes the preparation of Examples O-W and Samples 15-23.

TABLE IV

Summary of Examples O-W and Samples 15-23.

| Examples | Sample | Method of Making Article | PET Film/ Smooth Plates | Primary Groove Angle (degrees) |
| --- | --- | --- | --- | --- |
| Comparative Example O | 15 | Pressing | Yes | 82.8554 |
| Example P | 16 | Pressing | Yes | 82.8554 |
| Example Q | 17 | Pressing | Yes | 82.8554 |
| Comparative Example R | 18 | Pressing | Yes | 82.8589 |
| Example S | 19 | Pressing | Yes | 82.8589 |
| Comparative Example T | 20 | Pressing | Yes | 82.9625 |
| Example U | 21 | Pressing | Yes | 82.9625 |
| Example V | 22 | Casting | No | 82.8452 |
| Example W | 23 | Pressing | Yes | 82.8452 |

Colorimetric characteristics of Samples 15-23 under nighttime conditions (nighttime color) were measured according to the test method described in ASTM E811. The chromaticity and luminance factor (CAP Y) using the CIE system (daytime color) were measured according to the test method described in ASTM E308. Performance requirements for nighttime color and daytime color of retroreflective sheetings for traffic control are specified in ASTM D4956-09 and in European Specification CUAP N° 1.06/04.

The four pairs of chromaticity coordinates in the color space determine the acceptable color in terms of the CIE 1931 Standard Colorimetric System measured with Standard Illuminant D65 (geometry)45/0° and define what is generally known in the art as "the color box." The daytime color box for white retroreflective sheeting according to ASTMD4956-09 and the nighttime Color Box according to CUAP N° 1.06/04 are shown in Table V.

TABLE V

Daytime and Nighttime Color Boxes for White Retroreflective Sheeting.

| | 1 | | 2 | | 3 | | 4 | |
| --- | --- | --- | --- | --- | --- | --- | --- | --- |
| Condition | x | y | x | y | x | y | x | y |
| Daytime | 0.303 | 0.300 | 0.369 | 0.366 | 0.340 | 0.393 | 0.274 | 0.329 |
| Nighttime | 0.475 | 0.452 | 0.360 | 0.415 | 0.392 | 0.370 | 0.515 | 0.409 |

Table VI summarizes the results for roughness measurements ($R_a$) of the treated toolings used to produce Samples 15 through 23, the coefficient of retroreflection $R_A$, the nighttime color values for Samples 15 through 23, and the daytime color values for Samples 15 through 23.

TABLE VI

Summary of Results for Examples O-W and Samples 15-23.

| Example | Sample | $R_a$ (nm) | $R_A$ (candelas lux/m$^2$) | Nighttime Color x | Nighttime Color y | Daytime Color CAP Y | Daytime Color x | Daytime Color y |
|---|---|---|---|---|---|---|---|---|
| Comp. Example O | 15 | 0.41 | 330.0 | 0.4504 | 0.4116 | 43.85 | 0.3092 | 0.3239 |
| Example P | 16 | 2.53 | 210.2 | 0.4752 | 0.4206 | 50.80 | 0.3011 | 0.3172 |
| Example Q | 17 | 2.73 | 115.9 | 0.4863 | 0.4204 | 53.98 | 0.2998 | 0.3163 |
| Comp. Example R | 18 | 0.36 | 389.8 | 0.4498 | 0.4124 | 44.27 | 0.3087 | 0.3238 |
| Example S | 19 | 3.38 | 172.1 | 0.4999 | 0.4252 | 57.44 | 0.3004 | 0.3177 |
| Comp. Example T | 20 | 0.44 | 814.9 | 0.4427 | 0.4106 | 44.71 | 0.3081 | 0.3228 |
| Example U | 21 | 13.5 | 56.6 | 0.5498 | 0.4105 | 64.71 | 0.3026 | 0.3215 |
| Example V | 22 | 1.71 | 132.5 | 0.4970 | 0.4197 | 61.61 | 0.3057 | 0.3243 |
| Example W | 23 | 1.71 | 271.0 | 0.4964 | 0.4243 | 60.86 | 0.3062 | 0.3246 |

Table VI illustrates various properties of the samples described herein. For example, Table VI shows the increasing surface roughness $R_a$ with increasing etching times. One exemplary, non-binding theory is that increased roughness results from larger surface structures introduced by texturizing the tooling. Because surface structures scatter light, they may cause or contribute to a controlled reduction in retroreflectance. Larger surface structures may selectively scatter light of different wavelengths which in turn may lead to a difference in nighttime color of the sheeting (i.e., under retroreflection). The chromaticity coordinates for a white retroreflective sheeting produced with a tooling with increased roughness may fall within the daytime color box limits (i.e., under diffuse light) but outside of the nighttime color box limits. Exemplary preferred sheetings fall within both the daytime and nighttime color boxes.

Table VI also suggests that the groove angle of the tooling may affect the size of the surface structures created during electroplating or chemical etching. Data in Tables IV and VI show that a higher groove angle tooling etched for the same amount of time as a lower groove angle tooling has increased surface roughness.

As those of skill in the art will recognize, adjusting plating conditions will shift groove angle. There are a variety of ways to deform cubes and change groove angle that are known to those of skill, including mechanically deforming tooling, changing plating conditions, etc. Theoretically, deformation of cubes and change of groove angle introduces stress into the tooling and/or process. It is within the scope of the present application to adjust plating conditions to produce tooling with compressive stresses resulting in generally smaller groove angles compared to the design target of Comparative Example A. It may be preferred to achieve the desired sheeting characteristics by altering one or more of, for example, surface roughness, cube size, and groove angle. Those of skill in the art will appreciate that effect of distortion and surface roughness on the sheeting produced using a mold will vary based on the cube size (e.g., there may be more angle error in small cubes and less angle error in large cubes).

Preferred retroreflective sheeting of the present application exhibits any of the fractional retroreflectance properties (e.g., for an entrance angle β of −4 degrees) shown herein and/or described above. In one aspect, the retroreflective sheeting exhibits a % $R_T$ of between about 3% and about 15% at a maximum observation angle $\alpha_{max}$ of 0.5 degrees, more preferably between about 5% and about 12%. The fractional retroreflectance may have a minimum value of any integer within and including these values as well.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. The scope of the present application should, therefore, be determined only by the following claims. Various modifications and alterations of the present invention will become apparent to those skilled in the art without departing from the spirit and scope of the invention.

What is claimed is:

1. An article comprising at least one truncated cube corner element that is texturized; wherein the at least one truncated cube corner element has an average surface roughness between about 0.0005 microns and about 0.0060 microns.

2. The article of claim 1, in which the article comprises a tool.

3. Positive and negative replicas of the tool of claim 2.

4. The replica of claim 3, in which the replication is retroreflective sheeting comprising an array of cube corner elements.

5. The replica of claim 3, in which the replication is retroreflective sheeting comprising an array of cube corner cavities.

6. The article of claim 1, in which the article comprises retroreflective sheeting.

7. The article of claim 6, in which the retroreflective sheeting includes cube corner elements.

8. The article of claim 6, in which the retroreflective sheeting includes cube corner cavities.

9. The article of claim 1, wherein the average surface roughness is between about 0.0010 microns and about 0.0030 microns.

* * * * *